(12) United States Patent
Nishiyama et al.

(10) Patent No.: US 7,077,751 B2
(45) Date of Patent: Jul. 18, 2006

(54) PORTABLE AND STATIONARY GAME MACHINE SYSTEM

(75) Inventors: Takashi Nishiyama, Osaka (JP); Yoshinori Matsumoto, Osaka (JP)

(73) Assignee: SNK Playmore Corporation, Osaka (JP)

( * ) Notice: Subject to any disclaimer, the term of this patent is extended or adjusted under 35 U.S.C. 154(b) by 261 days.

(21) Appl. No.: 10/195,040

(22) Filed: Jul. 13, 2002

(65) Prior Publication Data

US 2002/0187833 A1    Dec. 12, 2002

Related U.S. Application Data

(63) Continuation of application No. 09/056,264, filed on Apr. 7, 1998, now abandoned.

(30) Foreign Application Priority Data

| Apr. 7, 1997 | (JP) | ............................... P.9-124653 |
| Oct. 20, 1997 | (JP) | ............................... P.9-306398 |
| Oct. 28, 1997 | (JP) | ............................... P.9-312793 |

(51) Int. Cl.
*A63F 13/00* (2006.01)

(52) U.S. Cl. ............................... 463/43; 463/42; 463/1

(58) Field of Classification Search ............ 463/40–42, 463/31, 20, 23, 29, 32, 35, 43, 44, 1; 600/483; 73/651; 345/157; 340/323 R
See application file for complete search history.

(56) References Cited

U.S. PATENT DOCUMENTS

| 3,797,010 | A | * | 3/1974 | Adler et al. ............. 340/323 R |
| 4,521,014 | A | * | 6/1985 | Sitrick ........................ 463/31 |
| 4,572,509 | A | * | 2/1986 | Sitrick ........................ 463/31 |
| 4,710,873 | A | * | 12/1987 | Breslow et al. ................ 463/31 |
| 4,858,930 | A | * | 8/1989 | Sato ............................. 463/23 |
| 5,184,830 | A | * | 2/1993 | Okada et al. ................. 463/29 |
| 5,307,452 | A | * | 4/1994 | Hahn et al. ................. 345/592 |
| 5,428,528 | A |  | 6/1995 | Takenouchi et al. ........ 364/410 |
| 5,469,536 | A | * | 11/1995 | Blank ........................ 345/594 |
| 5,553,864 | A | * | 9/1996 | Sitrick ........................ 463/31 |
| 5,572,646 | A |  | 11/1996 | Kawai et al. ................ 395/501 |

(Continued)

FOREIGN PATENT DOCUMENTS

EP       0 918 298 A1    5/1999

(Continued)

*Primary Examiner*—John M. Hotaling, II

(57) ABSTRACT

A game system including a stationary game machine requiring an external power supply, such as a coin-operable business-use game machine or a home game machine, and a portable game machine having an internal power supply. Game programs for raising game characters are installed in the stationary and portable game machines. The stationary game machine has more internal resources, and its programs support higher resolution video game data. The portable game machine has a vibration sensor for receiving input during play, resulting in the raising of the character. Each of these game machines are provided with a radio data transfer means through which a game result from a memory in one of the game machines can be transferred to a memory in the other game machine. The game machine receiving the game result can use that result in subsequent processing, such as for a starting point in further play or for creating video data that can be printed on a printer. The game machine receiving the result can include a camera for generating images of a player and an image synthesizing mechanism for combining player images with character images so that the resulting synthesized image can be printed. Further game results can be passed back to the portable game machine, or to another game machine, for further game play.

29 Claims, 15 Drawing Sheets

U.S. PATENT DOCUMENTS

| | | | |
|---|---|---|---|
| 5,595,389 A | 1/1997 | Parulski et al. | 463/31 |
| 5,601,487 A | 2/1997 | Oshima et al. | 463/4 |
| 5,618,045 A | 4/1997 | Kagan et al. | 463/40 |
| 5,724,074 A | 3/1998 | Chainani et al. | 345/474 |
| 5,766,077 A | 6/1998 | Hongo | 463/30 |
| 5,809,520 A | 9/1998 | Edwards et al. | 463/45 |
| 5,830,065 A * | 11/1998 | Sitrick | 463/31 |
| 5,891,042 A * | 4/1999 | Sham et al. | 600/483 |
| 5,951,015 A | 9/1999 | Smith et al. | 463/34 |
| 5,971,855 A | 10/1999 | Ng | 463/42 |
| 5,984,780 A * | 11/1999 | Takemoto et al. | 463/20 |
| 6,007,428 A | 12/1999 | Nishiumi et al. | 463/36 |
| 6,022,274 A | 2/2000 | Takeda et al. | 463/44 |
| 6,074,300 A | 6/2000 | Hirano et al. | 463/43 |
| 6,147,674 A * | 11/2000 | Rosenberg et al. | 345/157 |
| 6,371,854 B1 * | 4/2002 | Ikeda et al. | 463/42 |
| 6,386,041 B1 * | 5/2002 | Yang | 73/651 |

FOREIGN PATENT DOCUMENTS

| | | |
|---|---|---|
| JP | 6-61390 | 6/1985 |
| JP | 63-242293 | 10/1988 |
| JP | 06165881 | 6/1994 |
| JP | 3014733 | 6/1995 |
| JP | 2642088 | 1/1996 |
| JP | 08047579 | 2/1996 |
| JP | 08-103568 A | 4/1996 |
| JP | 08106539 | 4/1996 |
| JP | 08-131654 A | 5/1996 |
| JP | 08-309032 A | 11/1996 |
| JP | 3048489 | 2/1998 |

* cited by examiner

PORTABLE AND STATIONARY GAME MACHINE SYSTEM

This application is a continuation of application Ser. No. 09/056,264, filed Apr. 7, 1998, now abandon.

BACKGROUND

1. Field of the Invention

This invention relates to a gaming system which enables a player to use the temporary result -of game play on a portable gaming machine to continue the game play on a home or business use gaming machine.

The invention also relates to a raising simulation gaming machine and a raising gaming system using the same, and more particularly to a raising game of raising a virtual character or simulating love with a virtual character as a game player performs key input operation, etc., and a raising gaming system and a raising game method of providing a composite image of the image of the virtual character raised on the raising game and the image of the game player and displaying or printing the composite image.

2. Description of Related Art

An initial data input system of a game as described in (A) the Unexamined Japanese Patent Application Publication No. Sho 63-242253 is known as a conventional art similar to the above-described gaming system. This art aims at enabling a player to challenge a business use video game with a character having ability grown using a home video game.

The Japanese Patent No. 2642088 (B) discloses a configuration wherein a game program of a small child electronic gaming unit can be electronically connected to a large parent gaming unit so that a game played on the child electronic gaming unit can be executed on the large parent gaming unit with a large keying section and an external display unit having a large screen.

Further, GAME BOY electronic game machine of Nintendo Kabushiki kaisha, TAMAGOTCHI electronic game machine of Bandai Kabushiki kaisha, and the like are known as conventional portable games and raising games making the most of the characteristics of the portable gaming machines are in fashion.

The characteristics of the portable gaming machine are to enable a game player to play a game at any time and anywhere and always carry the portable gaming machine for playing a game because the gaming machine has an internal power supply such as a battery; for example, to raise a pet, the portable gaming machine enables the game player to also play a passive game in addition to active games as conventional games.

To use the portable gaming machine for a raising game of a pet of a virtual character as described above, the pet being raised requests '~meal," 'play," etc., of the game player by voice, etc., and the game player can play a passive game of performing game operation in response to the request, so that the game player can perform an act of raising the pet in a manner near actual pet raising; the game player feels a stronger attachment to the pet as compared with a conventional gaming machine enabling the player only to perform an active raising act.

A conventional raising simulation gaming machine is a gaming machine on which a game player raises a virtual character based on a predetermined raising simulation program; a generally known one is a size as large as a business card so that the gaming machine can be carried.

Such a portable raising simulation gaming machine has a memory for storing a raising simulation game program and control means for making a game proceed according to the raising simulation game program. The gaming machine requests care of "meal," "play," etc., of the game player according to the raising simulation game program. When the game player selects a meal, gives it to the pet, and keeps the pet company by entering commands through key input means based on the requests, image data of the character responsive to the raising simulation result of the above-mentioned key input, etc., is determined by the control means from image data of a number of characters stored in the memory as if the virtual character grew in response to the care, and the determined image data is displayed on a display.

The virtual character raised as described above is raised by the game player who enters commands through keys, etc., and thus can be raised like a-lovely pet as a so-called virtual pet. Since such a virtual pet can be kept in a portable raising simulation gaming machine, ~there is not a fear of putting neighbors to trouble as dogs or cats and no keeping space is required, so that anybody can have a pet with a light heart. Particularly, in recent years it has become very difficult to keep pets in large cities and abandoned cats, dogs, etc., are at stake. With this being the situation, demand for such virtual pets will increase in the future.

Further, some game software programs of home fixed gaming machines provide games to bring up girls or children.

However, in the related art (a), the ability data of the character raised on the home gaming machine requiring an external power supply is used for the player to play a game on a business use gaming machine. For example, when the data of the raised character is transferred to the business use gaming machine and a player plays a game on the business use gaming machine based on the transferred data, if the character is a little insufficient to grow, it cannot be raised additionally on the spot. For example, assuming that the game played on the business use gaming machine described above is a combative sport game, the win-loss record against an opponent on the business use gaming machine changes entirely depending on whether or not the raised character has ability lower than the opponent by one level.

In the related art (b), a game that can be played on a small gaming machine is simply allowed to be played on a large screen by operating large keys, and large and small gaming machines do not operate under different game programs, thus the game lacks fun.

A game is proposed wherein the above-described portable gaming machines are connected by a cable and the characters raised on the portable gaming machines are made to fight with each other or marry. However, the player cannot continue to play the game on a home or business use gaming machine of high image quality with the character raised on the portable gaming machine.

It is therefore an object of the invention to provide a new gaming system which enables a player to play a game on a home or business use gaming machine based on the game play result on a portable gaming machine.

By the way, a known machine for raising a virtual pet (character) as described above is a machine for raising the pet only in a simple unit such as a portable raising simulation gaming machine, thus the capacity of storing character information of image information, etc., of characters that can be raised on the portable raising simulation gaming machine and the display capability of the character information are limited. For example, a character image displayed on a display is formed by monochrome, rough dots and is extremely plain and simple as compared with real cats or dogs. To satisfy a demand as a pet replacing a real cat or dog, an image, reaction, etc., close to a real image to which the player can feel an attachment like a real pet needs to be represented as a virtual character. However, it is difficult to accomplish it on a portable or home gaming machine because of a high cost and upsizing the gaming machine.

For example, to bring up a child, his or her parent may take a souvenir photograph on a ceremony such as a birthday, graduation ceremony, or a wedding. A raising simulation gaming machine for taking such a souvenir photograph does not exist. The reason why such ceremonies are not provided is that if a raising simulation gaming machine on which such ceremonies can be performed is provided, it is feared that the raising game itself will be good for nothing if the ceremonies become old-fashioned.

In addition, on such a ceremony, parents often have souvenir photograph taken together with their child rather than the brought-up child solely has his or her souvenir photograph taken as described above. A conventional raising simulation gaming machine which enables the game player to have his or her photograph taken together with a raised character does not exist.

Further, hitherto, the player has raised a pet (character) in a virtual world (closed society like a home) only within his or her raising simulation gaming machine. However, it is more like the real world to move a character raised by one person to a raising simulation gaming machine of another person as an adopted child or marry a character raised by one person to a character raised by another person for relating the characters raised by different persons to each other or promoting interaction among game players.

Some game software programs of home fixed gaming machines provide games to bring up girls or children. However, since the gaming machine cannot be carried, the game player plays a game (raises a pet) on the gaming machine whenever he or she wants to play the game; passive trouble as the pleasure of raising the pet around the clock cannot be given to the game player. The passive trouble is trouble of care soothing or scolding a dog or a cat in response to meal requests made by the dog or cat not considering the time. Like the above-described portable gaming machine, the home gaming machine is also a gaming machine for raising a pet in a closed virtual world in the gaming machine, thus the world in which a pet or a child is raised is narrow and poor in reality and the game lacks fun.

It is therefore an object of the invention to provide a raising gaming system wherein game players can raise virtual characters in a virtual world closer to a real world communicating with other game players and other virtual social facilities on raising simulation gaming machines for raising virtual characters. It is another object of the invention to provide a raising simulation gaming machine that can print a commemorative photograph of a raised character and a commemorative photograph provided by combining a game player with a raised character.

SUMMARY OF THE INVENTION

According to the invention of aspect 1, there is provided a gaming system comprising a gaming machine requiring an external power supply, such as a coin-operable business use gaming machine installed in a store, etc., or a home gaming machine and a portable gaming machine having an internal power supply for enabling a player to carry the portable gaming machine and play a game thereon, characterized in that game programs for enabling players to play different games are installed in the portable gaming machine and the gaming machine, that each of the portable gaming machine and the gaming machine is provided with data transfer means through which a temporary game result can be transferred from the portable gaming machine to the gaming machine, and that the gaming machine can receive data storing temporary results of games played on two or more different portable gaming machines through the data transfer means and execute the next process such as continuing the game play or printing based on the received data.

In the invention of aspect 2, in the gaming system of aspect 1, the data transfer means for transferring the temporary result of the game played on the portable gaming machine to the gaming machine adopts a radio transfer system and the radio data transfer is executed using power from the internal power supply.

Besides, in the invention of aspect 4, in the gaming system of aspect 3, the radio system is selected from the group of a spurious spread system, a time division system, a frequency shift key (FSK) system, infrared communication, pulse communication, and AM/FM communication.

The expression "game programs differ" contains the fact that one game program is upgraded as compared with any other game program.

The external power supply is a power supply previously fixed in a house. Alternatively, it could be a set of batteries or the like.

According to the invention of aspect 4, there is provided a gaming system comprising a first raising simulation gaming machine comprising first raising means having a first raising simulation game program for raising a character and first storage means for storing first raising history data of a virtual character formed by the first raising simulation game program and first data transfer means for transferring the first raising history data stored in the first storage means to a second raising simulation gaming machine, and a second raising simulation gaming machine comprising second raising means having a second raising simulation game program for raising a character and second storage means for storing second raising history data of a virtual character formed by the second raising simulation game program and second data transfer means for receiving the first raising history data transferred through the first data transfer means from the first raising simulation gaming machine, characterized in that the second raising simulation gaming machine can store second history data of the character additionally raised by the second raising means according to the second raising simulation game program based on the received first raising history data in the second storage means, and that the second raising simulation gaming machine further comprises second display means for displaying an image of a character prepared based on image data previously stored in image data storage means (fourth storage means) based on the first or second raising history data.

The first or second data transfer means may be means for transferring character raising history data from the first raising simulation gaming machine via a memory card to the second raising simulation gaming machine or between the first and second raising simulation gaming machines by cable communication or optical communication. Raising history data is coded into history code and history code represented by a several-digit number or several characters is given from the first raising simulation gaming machine to the game player, who then enters the history code in the second raising simulation gaming machine through key input means, etc., thereby transferring the first raising history data. This is also contained in the transfer in the invention.

The first and second raising simulation game programs may be raising simulation game programs common to the same models or different models or different programs. However, the raising history data is previously standardized so that it can be interpreted and used by both the first and second raising simulation game programs. The second data transfer means also contains means having only a function of receiving the first raising history data from the first data transfer means, of course.

In the invention of aspect 5, in the gaming system of aspect 4, the second raising simulation gaming machine further includes an image reproduction unit and can reproduce the character image prepared based on the image data in the image data storage means on the image reproduction unit.

In the invention of aspect 6, in the gaming system as claimed in claim 4, the first raising simulation gaming machine further includes first display means and image data storage means (third storage means) for storing a plurality of image data pieces and displays a character image prepared based on the image data stored in the image data storage means (third storage means) based on the first raising history data on the first display means, and the image data stored in the image data storage means (fourth storage means) is of high image quality as compared with the image data stored in the image data storage means (third storage means) of the first raising simulation gaming machine and the image displayed on the second display means based on the image data in the image data storage means (fourth storage means) is made excellent in power of expression of resolution, coloring, etc., as compared with the image displayed on the first display means based on the same first raising history data for making a difference between the images.

To make an expression power difference between the images, for example, the second display means uses a color display and the first display means uses a monochrome display or a display control section is provided between the first and second display means and first or second character determination means and the expression power of the display control section provided in one display means is capable of two-dimensional display and that in the other display means is capable of three-dimensional display using computer graphics means using polygons, etc.

According to the invention of aspect 7, there is provided a raising simulation gaming machine comprising a raising simulation game program for raising a character, raising history data of the character formed by the raising simulation game program, and provided character image data assigned based on a temporary game result, characterized by a camera for taking a photograph of a person, an image combining means for combining image data of the taken photograph with image data of the raised character, and an image reproduction unit for reproducing a composite image of the image data.

According to the invention of aspect 8, there is provided a gaming system comprising a portable gaming machine comprising a raising simulation game program for raising a character and storage means for storing raising history data of a virtual character formed by the first raising simulation game program and a print gaming machine comprising an image reproduction unit and storage means for storing a plurality of image data pieces, characterized in that the portable gaming machine further includes data transfer means for transferring the raising history data to the print gaming machine, and that the print gaming machine further includes data reception means for receiving the transferred raising history data, wherein the image data with correspondence predetermined in response to the raising history data transferred to the print gaming, machine is transmitted to the image reproduction unit for reproducing an image of the image data.

In the invention of aspect 9, in the gaming system of aspect 8, the print gaming machine further includes photographing means and image combining means for combining image data of a photograph taken by the photographing means with the image data with correspondence predetermined in response to the raising history data and a composite image of the image' data is reproduced on the image reproduction unit.

In the invention of aspect 10, in the gaming system of aspect 9, the image reproduction unit is any of a display, a printer, or a laser beam machining unit.

According to the invention of aspect 11, there is provided a raising simulation gaming machine comprising storage means for storing a plurality of image data pieces, display means for displaying image data selected from among the image data pieces stored in the storage means, raising means for performing a raising action such as care for a virtual character based on the image data displayed on the display means, and a raising simulation program for raising the character in response to the raising action of the raising means, characterized in that the raising means is provided with a vibration sensor and the virtual character raising action is based on the number of steps taken or vibration frequency counted by the vibration sensor.

In the invention of aspect 12, in the gaming system of aspect 4, the first raising simulation gaming machine is a portable gaming machine.

In the invention of aspect 13, in the gaming system of aspect 12, the portable gaming machine further includes a vibration sensor and wherein the first raising simulation game program raises the virtual character based on the number of steps taken or vibration frequency counted by the vibration sensor.

In the invention of aspect 14, in the gaming system of aspect 13, the portable gaming machine further includes a hook. A player hangs the hook on his or her belt, etc., to make hands free and the portable gaming machine does not obstruct walking of the player carrying the gaming machine.

According to the invention of aspect 15, there is provided, in a gaming system wherein first raising history data is prepared by first raising means of a portable gaming machine enabling a player to carry the gaming machine and play a game thereon, having an internal power supply, first storage means, and first transfer means and second raising history data is prepared by second raising means of a coin-operable business use gaming machine installed in a store, etc., or a home gaming machine, having an external power supply, second storage means, and second transfer means, a gaming method comprising the steps of:

temporarily storing the first raising history data in the first storage means;

transferring the first raising history data from the first storage means to the second storage means by the first transfer means;

additionally raising second raising history data by the second raising means relative to the first raising history data from the second storage means;

transferring the resultant second raising history data to the first storage means by the first transfer means or third storage means by third transfer means; and again raising the second raising history data by the first raising means, or displaying the second raising history data from the third storage means on display means.

DETAILED DESCRIPTION OF THE PREFERRED EMBODIMENTS

Figure 1:
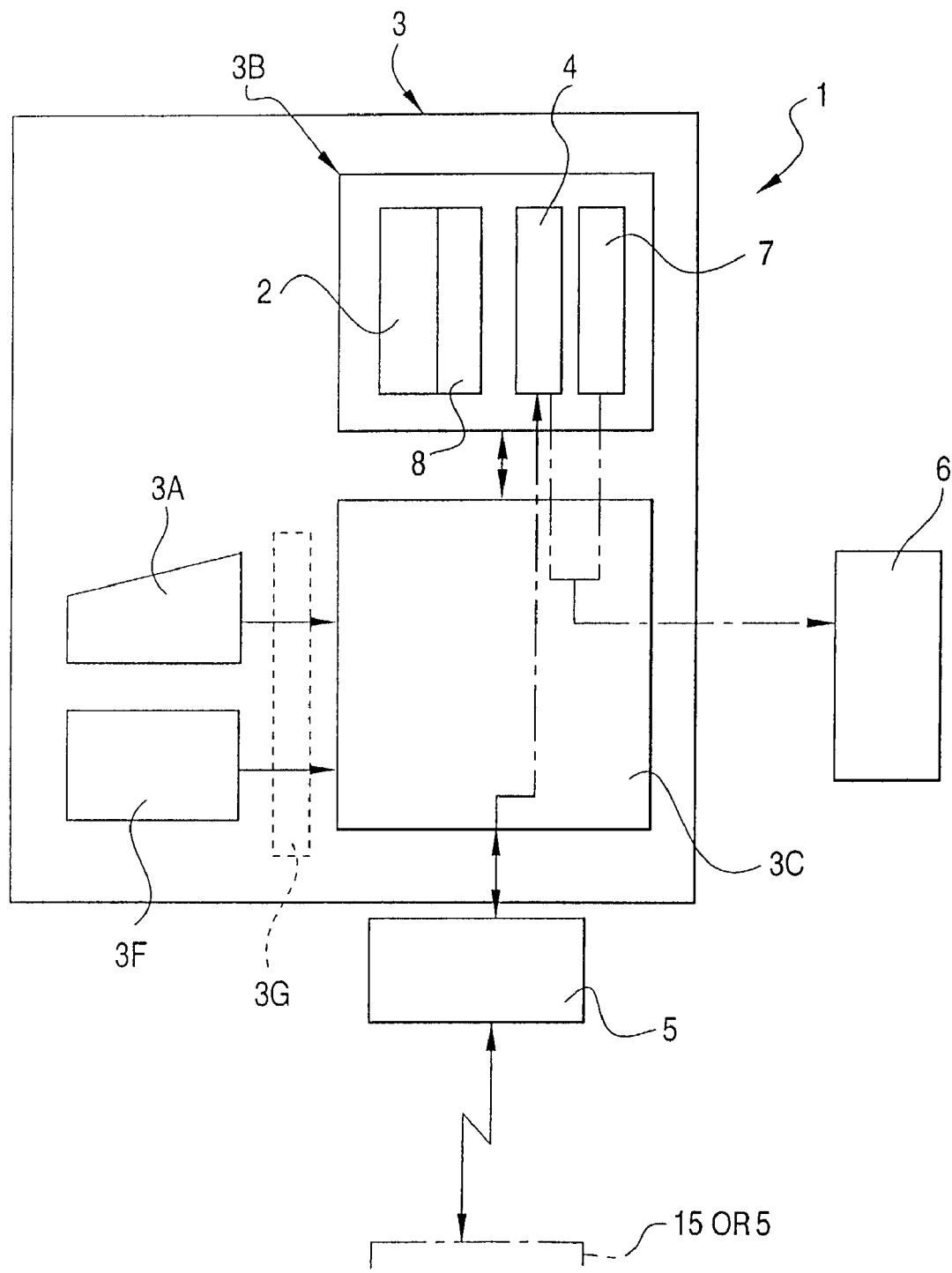
FIG. 1 is a functional block diagram of a portable gaming machine.
Figure 2:
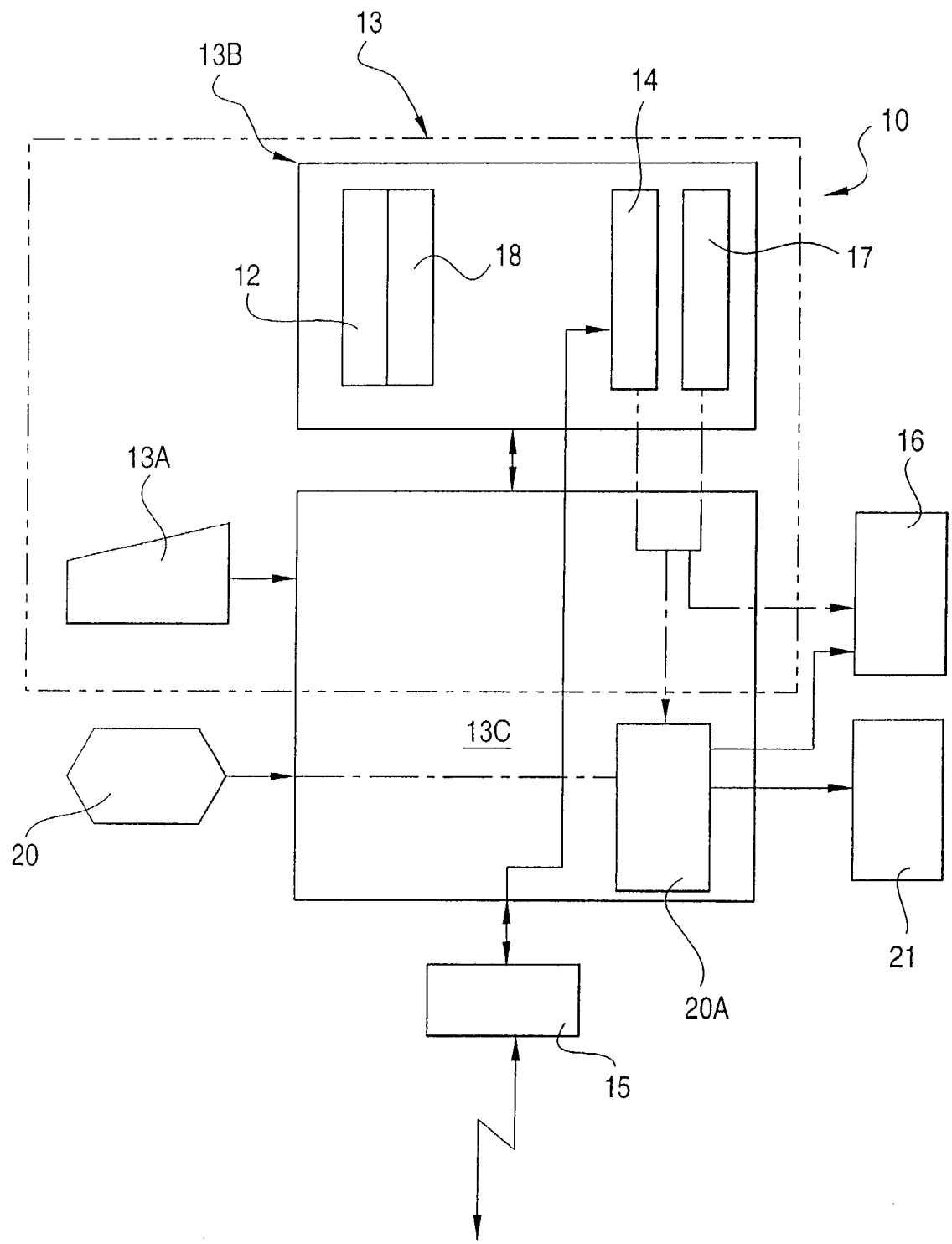
FIG. 2 is a functional block diagram of a gaming machine.

FIG. 1 and FIG. 2 are functional block diagrams to show one embodiment of the invention. Numeral 1 is a portable gaming machine and numeral 10 is a gaming machine.

(Portable Gaming Machine)

The portable gaming machine 1 shown in FIG. 1 is made up of first display means 6 for displaying the image of a raised character, first transfer means 5 for transferring first raising history information of the raised character to another gaming machine, and first raising means 3.

Figure 14:
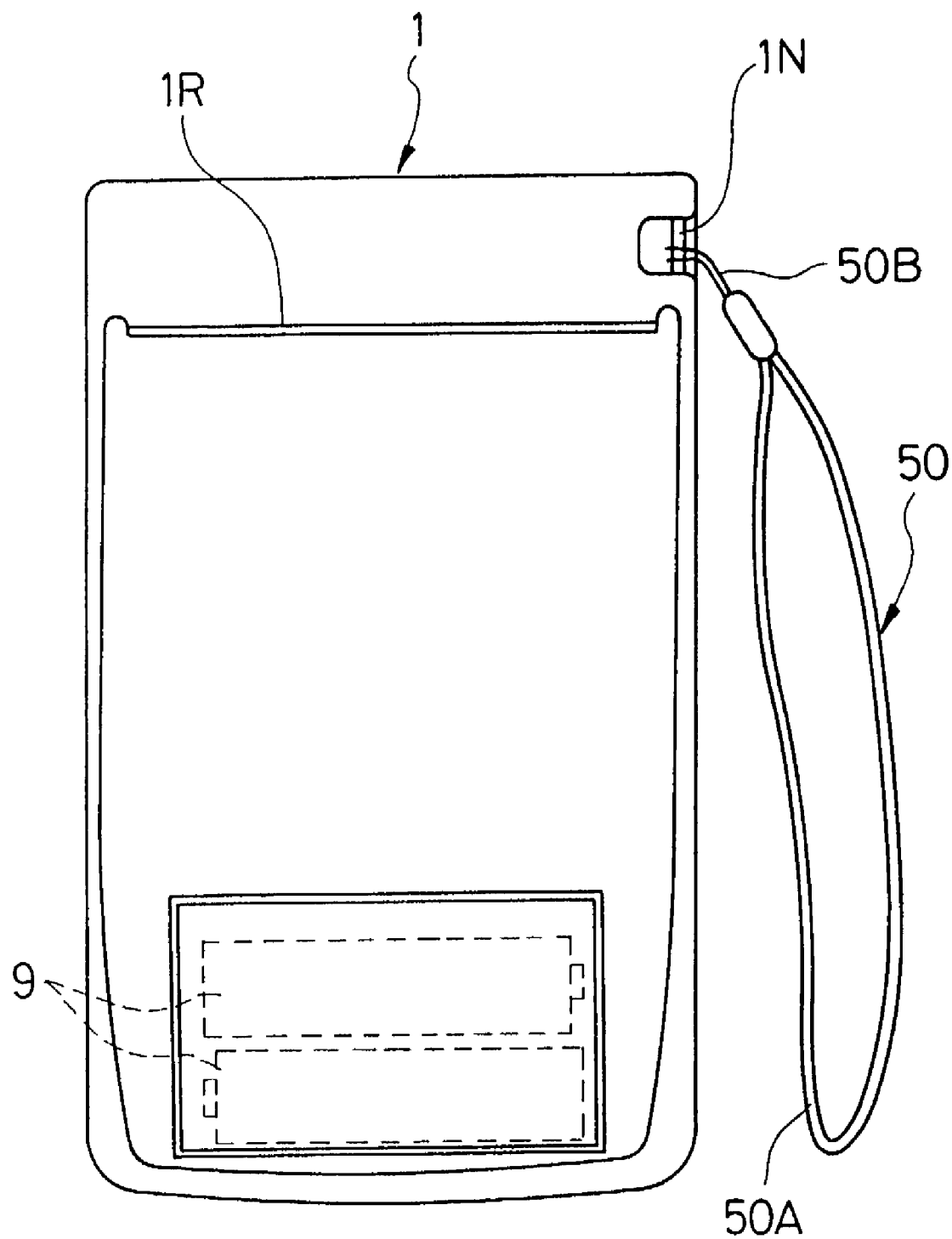
FIG. 14 is a rear view of the modified embodiment in FIG. 13.

In FIG. 14, numeral 9 is an internal power supply and the embodiment adopts AA batteries. The internal power supply 9 is thus provided to enable a player to play a game on the portable gaming machine 1 anywhere; the portable gaming machine 1 differs in use form from gaming machines requiring an external power supply such as home or business gaming machines described later.

The first raising means 3 comprises a first raising simulation game program 2 previously defining game progress, first storage means 4 for storing first history data of a raised character, first character determination means 8, third storage means 7 for storing-information of data of several types of character images that can be raised, and operation means 3A operated by a game player. Storage means 3B comprises the first raising simulation game program 2, the first storage means 4, the first character determination means 8, and the third storage means 7. The storage means 3B and the operation means 3A of the first raising means 3, the first display means 6, and the first transfer means 5 are controlled by a control section 3C such as a CPU (central processing unit) of the first raising means 3.

The first raising means 3 further includes a counter (not shown) for counting the game play time or the number of play times.

The game player operates the operation means 3A in response to game progress made along the first raising simulation game program 2. The first raising means 3 raises a character in response to the operation of the operation means 3A by the player, the game play time or the number of play times, and the like. Such raising data is stored in the first storage means 4 in a predetermined format as raising history data. The raising history data in the first storage means 4 is updated and stored in response to the player's operation of the operation means 3A, the game play time or the number of play times, and the like. The clause "a character is raised as the player operates the operation means" is used to mean that, for example, if the first raising simulation ga~ne program 2 causes the character to make a meal or play request or the game player spontaneously gives a meal to the character or keeps the character company, the shape of the character's body goes fat from slim figure depending on the meal giving timing and the meal kind and amount or the character is often sick through lack of exercise if the character does not much play, namely, the character characteristic changes as the game player operates the operation means. This topic will be discussed later in more detail.

In addition to the operation means 3A, a vibration sensor 3F for sensing vibration of walking, etc., of a human body is provided as means for raising a virtual character, whereby the raising simulation gaming machine as a portable game is provided with the function and advantage similar to those of a conventional pedometer for counting steps, a calorie consumption value, etc., of the user with the pedometer put around the hips and displaying the cumulative number of steps and calorie consumption value on first display means for health care for the user. Generally, it is said that preferably the cumulative number of steps a day is 10000. Nowadays, to overcome lack of exercise of children, a nursery school, a kindergarten, etc., distributes a pedometer to each child for health care for the children by checking the number of steps a day, etc. However, if the pedometer is distributed to the user who does not intend to take good care of his or her health, it cannot play an essential role in health care unless the person who is not conscious of health care intends to walk of his or her own accord. However, if exercise of walking, etc., of the player is involved in raising the virtual character as in the embodiment, there is a possibility that the player will hold intention to exercise of his or her own accord from a wish to raise an ideal character rather than health care.

Such a function may be provided by placing a rule that the greater the cumulative number of steps of the player carrying the portable gaming machine, the more vigorous or slimmer grows the character in the raising simulation game program. In doing so, the user intends to exercise as much as possible to raise the character as a more favorite character as well as to improve his or her health, so that the portable gaming machine becomes useful as a health care machine. The raising game as described above is a game having a large effect on the user to such an extent that if he or she kills the character being raised in the game, the user weeps. Thus, if children carry the portable gaming machines, the portable gaming machines can also contribute to solution to the problem of lack of exercise of the children as an object of public concern.

The vibration sensor 3F is not an indispensable member and a character can also be raised by operating the operation means 3A without the vibration sensor 3F, of course. A known sensor used with a pedometer, etc., can be used as the vibration sensor 3F. Any sensor can be applied if it is a walking sensor of a pedometer. For example, when a pendulum swings in a large amount, a weight thereof comes in contact with a sensor side wall and. when it comes in contact with the sensor side wall, electric switching may be executed. At this time, a step may be counted.

Numeral 3G is a switch circuit for determining a virtual character is raised in response to which input signal of the operation means 3A and the vibration sensor 3F. The switch circuit can be switched by the user. To raise a virtual character, the portable gaming machine can also be configured so that the player can give a meal to the character only by operating the operation means 3A and that exercise of the character depends only on the sensing result of the vibration Sensor 3F.

Figure 6:
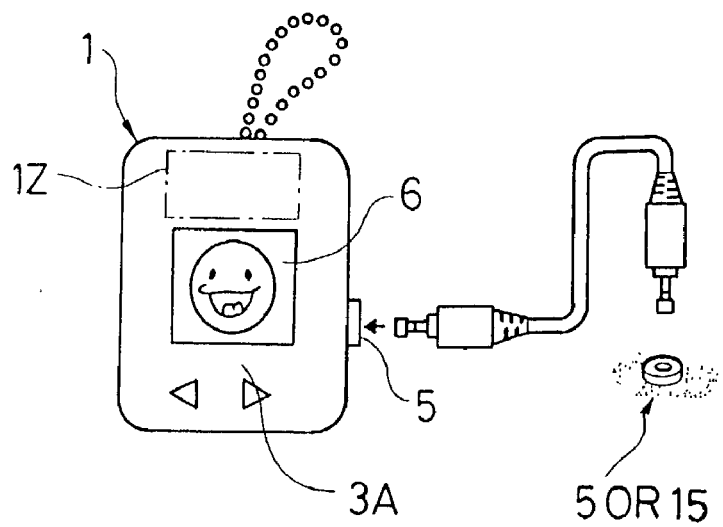
FIG. 6 is a schematic representation.
Figure 7:
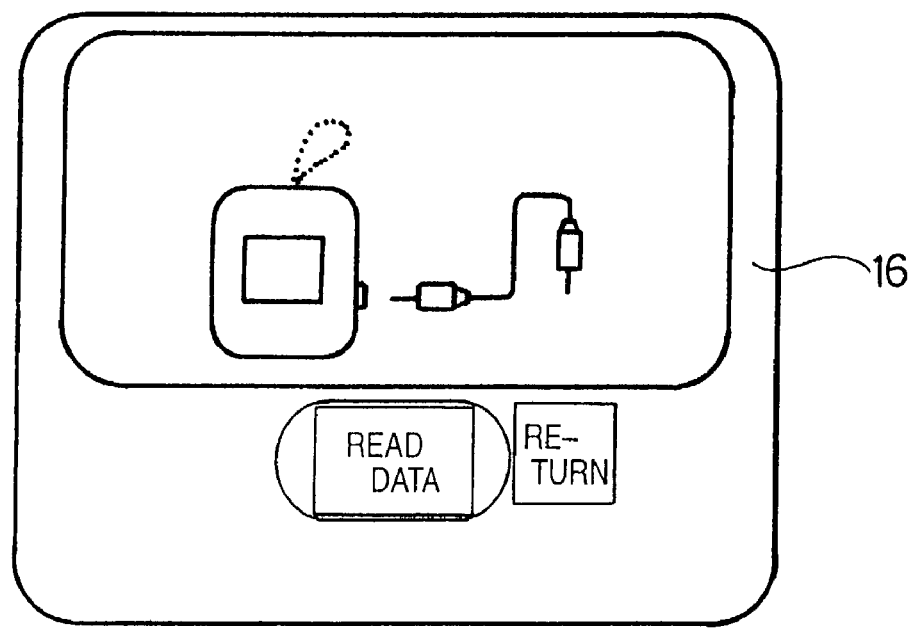
FIG. 7 is a schematic representation.

If a hook part 1Z hanged on a belt, etc., as shown by the one-dotted chain line in FIG. 6 is provided, the user can hang the portable gaming machine 1 on the hips when he or she goes out.

The portable gaming machine 1 is provided with the first display means 6 capable of displaying the image of the raised character as described above. The image displayed on the first display means 6 is provided in the memory as the third storage means 7. The first character determination means 8 generates image data responsive to first raising history data from among different types of character images provided in the third storage means 7 based on the first raising history data stored in the first storage means 4, and the image of the raised character is displayed on the first display means 6 in accordance with the image data.

The raising history data may be coded as address code of the corresponding image data for storage in the memory 7. If the images corresponding to the character raised in the first raising means 3 are thus stored as address codes, the amount of data to be stored can be lessened as compared with that when the raising history data is stored in the first storage means 4 intact. However, if the first raising history data is stored as first raw history data of all operation history of the game player operating the operation means 3A, the time, the number of play times, etc., and at the display time of the character image on the first display means 6, the first character determination means 8 determines features, body shape, hair style, etc., fitted to the character by calculation based on the first raising history data and necessary data required for the corresponding character representation is combined and displayed, a larger number of images finely changed following slight change in the raising history data can be provided.

However, the configuration requiring an expensive memory capacity as described above is not preferred at this moment in time from the viewpoint of the price of the portable gaming machine 1 and if the first character determination means 8 is provided with such a calculation function, the cost increases, which is not preferred.

Therefore, in fact, preferably the configuration as described above is adopted for a coin-operable business use gaming machine requiring an external power supply installed in a store, etc., (described later). The portable gaming machine is thus configured, whereby the image of the character raised by the game play who operates the operation means 3A along a game advanced by the first raising simulation game program 2 in the portable gaming machine 1 and raised in response to the number of steps of the game player sensed by the vibration sensor 3F is transferred through the first transfer means to a home or business use gaming machine where the image is displayed on second display means 16 as a clearer image than the image displayed on the first display means 6.

Specifically, in the gaming machine 10 shown in FIG. 2, the parts making up a character such as features, body shape, hair style, etc., of the character are stored separately in fourth storage means 17, second character determination means 18 generates the corresponding parts from first or second raising history data, and image combining means 20A combines the generated parts, then the resultant image is displayed on the second display means 16.

As described in the sections both above and below, data describing the state of a character that was raised via a game machine can be stored in a true historic log format (e.g., combat history, or history of player input from a sensor), in an image format, in an abilities format (e.g., storing character power or life point levels), or combinations of the above. Depending on the format of the data, this state data can be stored in various portions of memory, such as game memory, image memory, or other memories used to store any of the above data.

Any can be used as the first display means 6 if it can display an image; for example, a liquid crystal display, a CRT, a plasma display, or an LED display can be applied. However, to use the portable gaming machine 1 as a portable, preferably, easily compacted liquid crystal display means is applied. Further, to use an inexpensive memory having a small capacity as the storage means 3B of the third storage means 7, etc., if a TN liquid crystal monochrome display is adopted, a compact and inexpensive portable raising simulation gaming machine can be provided.

The raised character image that can be displayed on the raising simulation gaming machine 1 is thus simplified and the character image displayed or printed on the gaming machine 10 (described later) is made a full-color image with high resolution for making an extreme difference between the images, whereby the game player is more greatly impressed by the raised character displayed on the. gaming machine 10; the gaming ability can be improved.

(Raising Singly with Raising Simulation Gaming Machine)

Image data pieces A to X are assigned to virtual character images determined by the first character determination means 8 in response to the first raising history data stored in the first storage means 4 described above, as shown in FIG. 4. As A to X, image data is assigned as the first raising history data in the embodiment, but to raise a combative athlete, A to X hierarchical combative sport data pieces as power or life point levels can also be assigned as the first raising history data. The combative sport data may be leveled up from A or B to C or D in response to the raising time of the combative athlete (containing the number of play times) and the level of the combative sport data of another combative athlete beaten by that raised combative athlete. The first raising history data of the combative athlete thus raised can also be transferred to another combative sport gaming machine for making the combative athlete raised by the player fight against another combative athlete previously stored in the combative sport gaming machine or a combative athlete raised by another game player.

Figure 5:
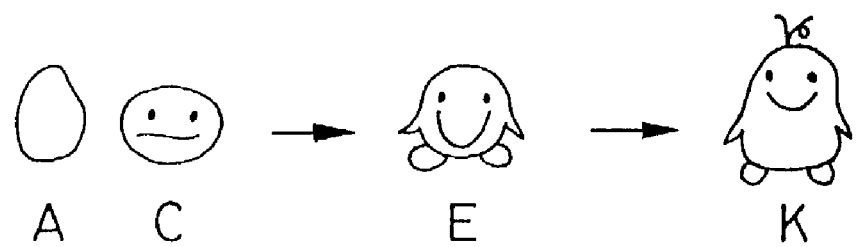
FIG. 5 is a schematic representation.

FIG. 5 shows an example of raising progress with the raising history data as the image data, as described above.

Figure 4:
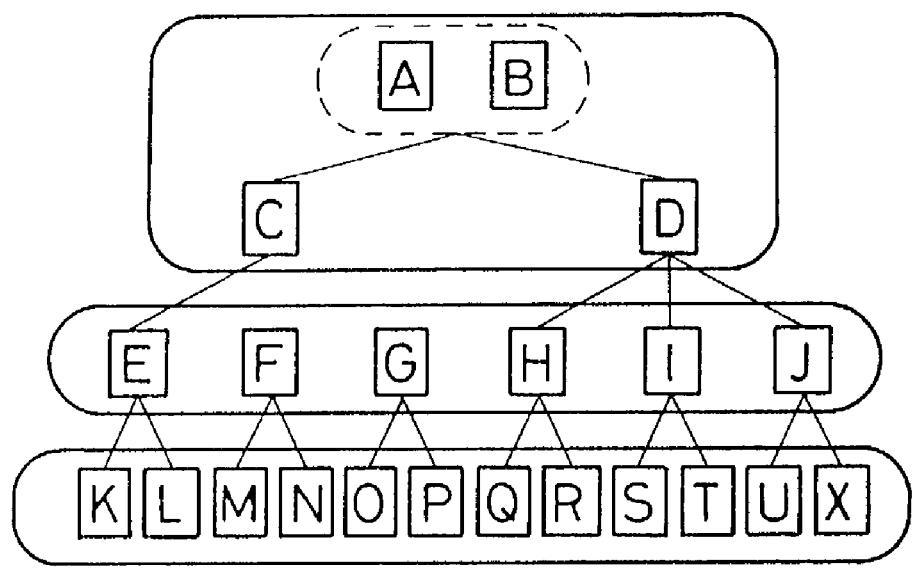
FIG. 4 is a schematic representation.

The raising progress example will be discussed with reference to FIG. 4 and FIG. 5. The game player chooses favorite egg A between two eggs A and B displayed on the second display means 6 by operating the operation means 3A (first step). A timer (counter)—not shown—starts counting the play time with the choice point in time as the reference and after the expiration of a predetermined time interval, the chosen egg A changes to character C (second step). Whether the egg A changes to character C or D can be automatically determined using a random number at the choice time of the egg A or B (for example, male or female) or can be determined by the game player who operates the operation means 3A by the time the egg A changes to the egg C. When the character C changes to E, whether C changes to E, F, or K is determined by the game player who operates the operation means 3A in response to "meal," "play" request made by the character C (third step).

Random numbers can be used so that different change is made if the operation timing differs even if the game player operates the operation means 3A in the same manner. Further, to change the character E to K, the game player may operate the operation means 3A as at the third step (fourth step). After this, the game player will raise the character by taking similar steps to the third and fourth steps.

(Modified Embodiment of Portable Gaming Machine)

Figure 13:
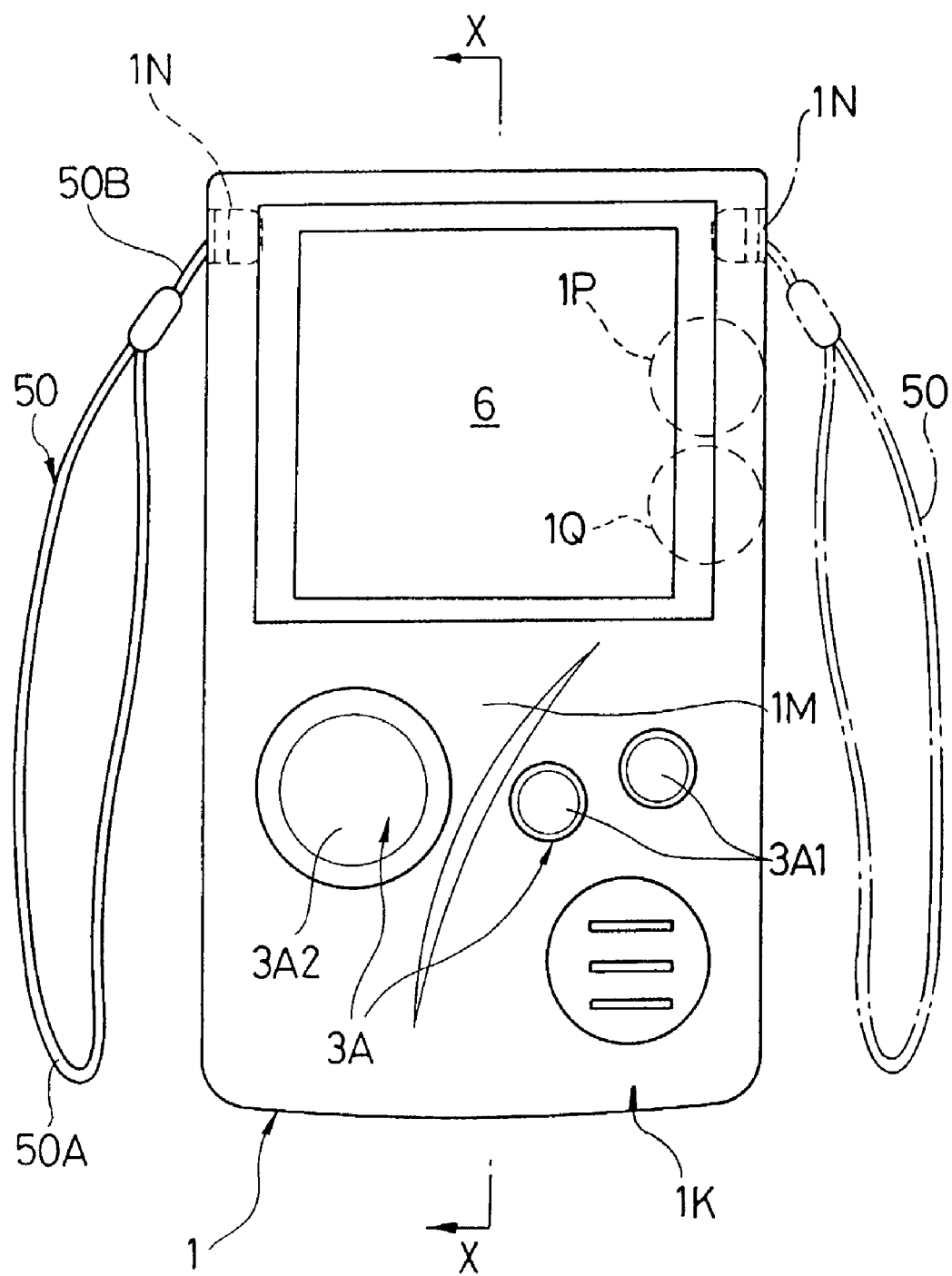
FIG. 13 is a front view to show a modified embodiment of the portable gaming machine according to the invention.
Figure 15:
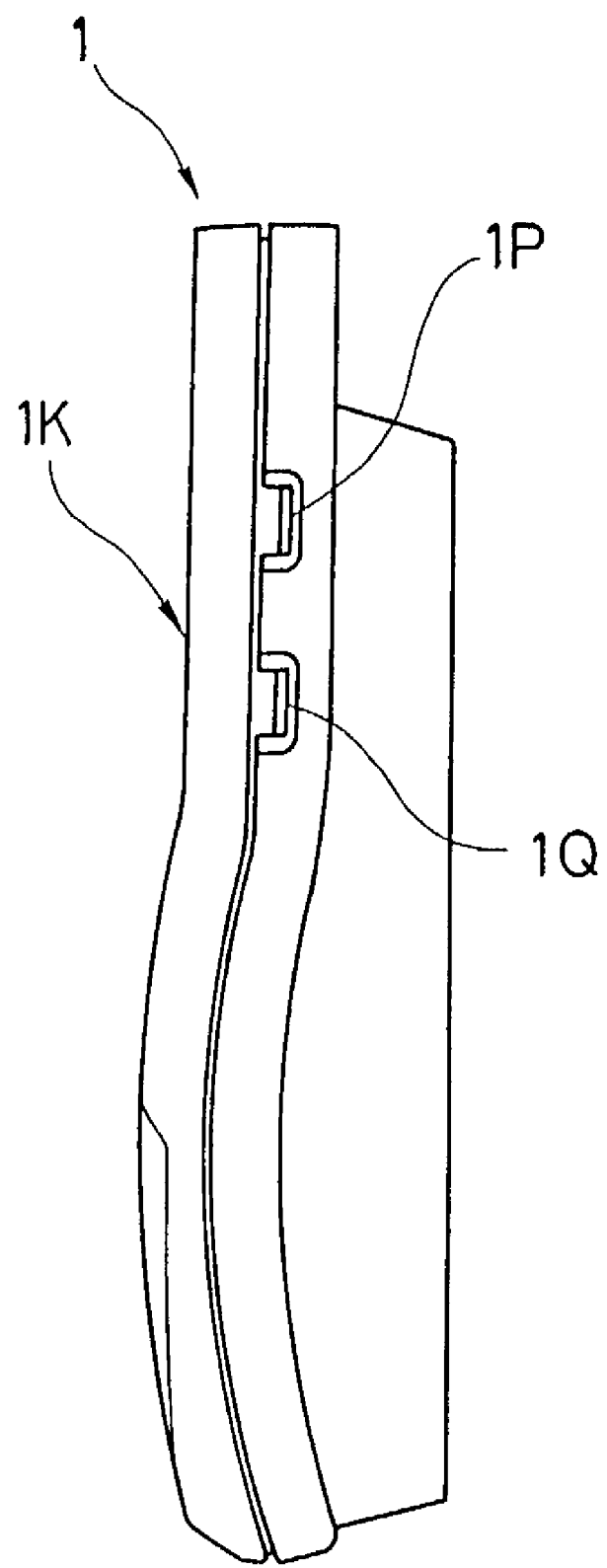
FIG. 15 is a right side view of the modified embodiment in FIG. 13.
Figure 16:
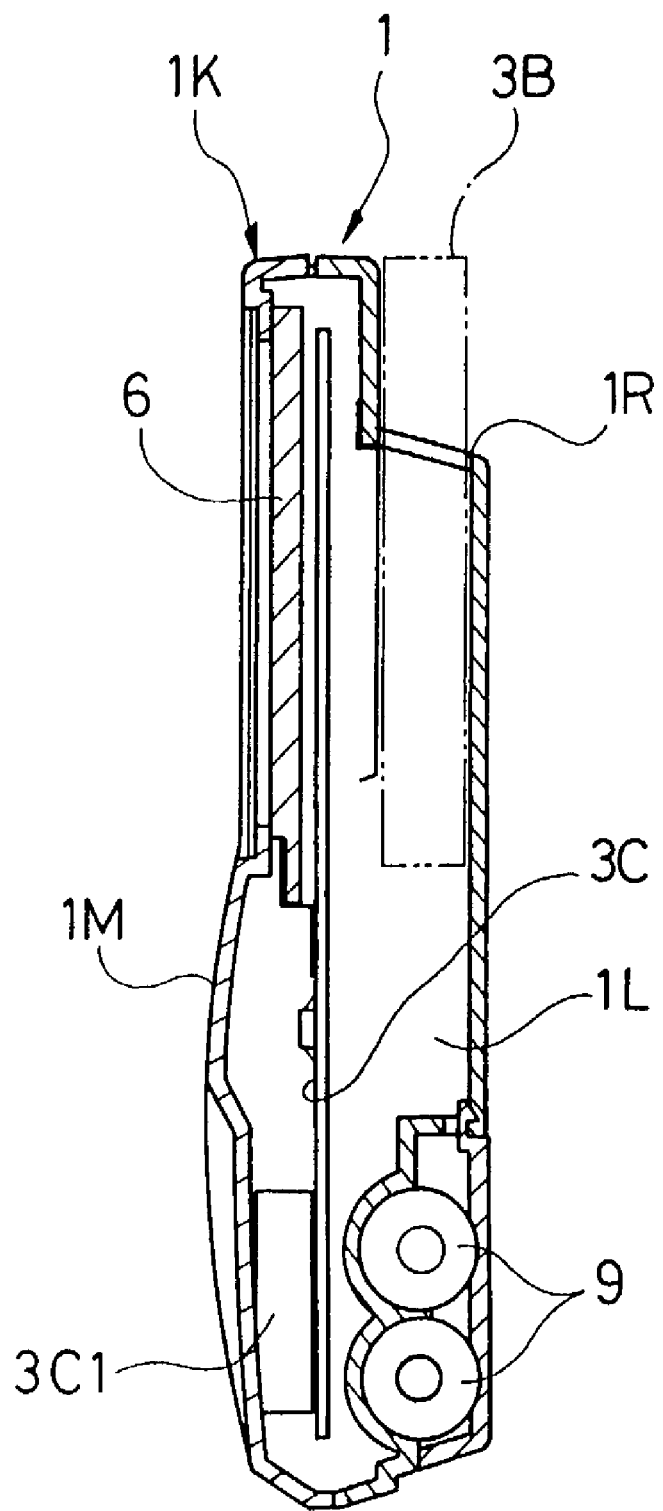
FIG. 16 is a sectional view taken on line X—X in FIG. 13.
Figure 17:
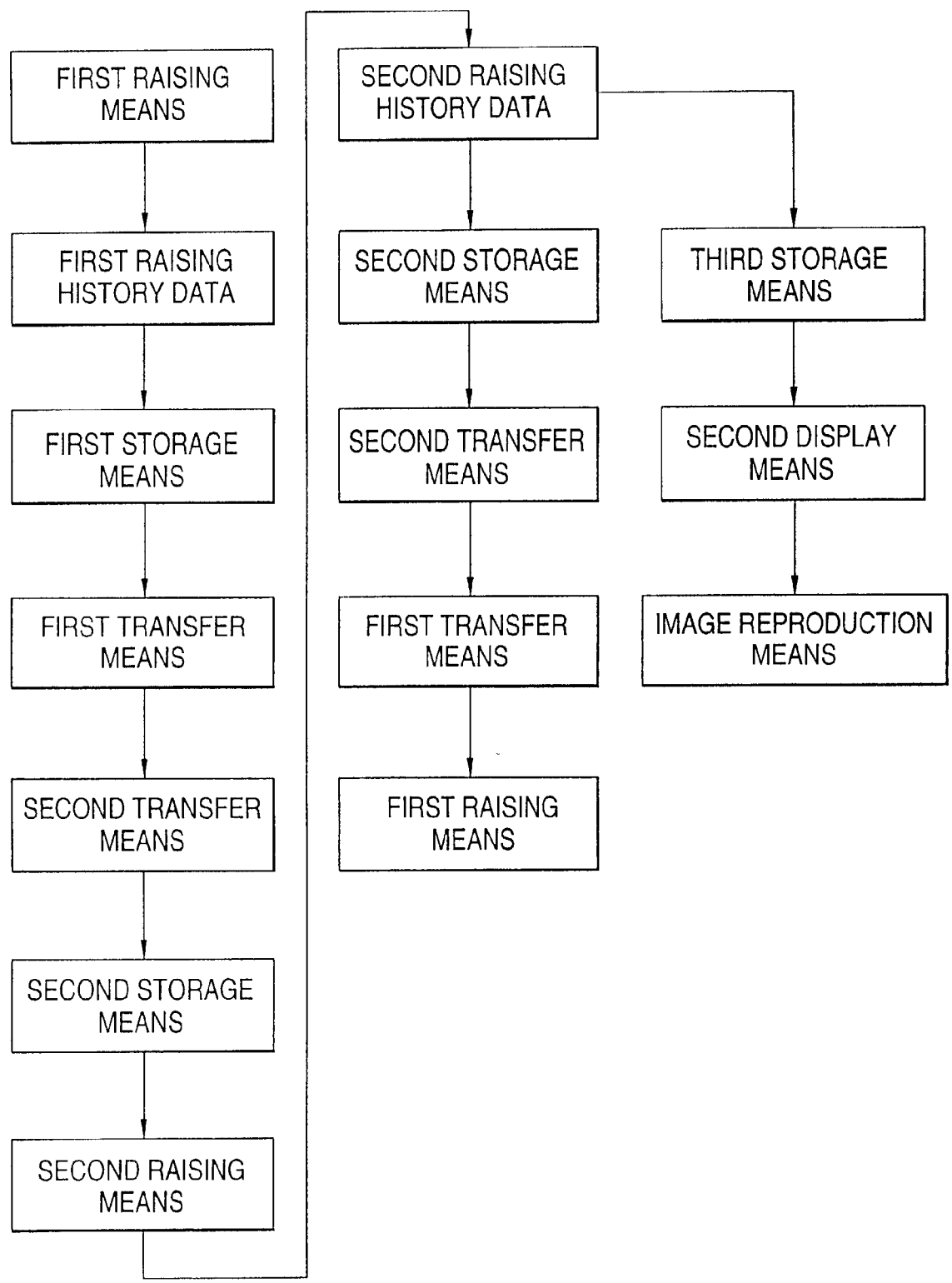
FIG. 17 is a flowchart of a gaming system.

FIG. 13 to FIG. 16 show a modified embodiment of the above-described portable gaming machine. FIG. 13 is a front view to show a modified embodiment of the portable gaming machine according to the invention. FIG. 14 is a rear view of the modified embodiment in FIG. 13. FIG. 15 is a right side view of the modified embodiment in FIG. 13. FIG. 16 is a sectional view taken on line X—X in FIG. 13. Parts identical with or similar to those of the above-described portable gaming machine are denoted by the same reference numerals in FIG. 13 to FIG. 16 and will not be discussed again.

In FIG. 13, numeral 1K is a rectangular box on a plan view, a main body of a portable gaming machine 1 according to the modified embodiment. An inside 1L of the box 1K contains batteries 9 biased to one side in the length direction and a game control section is housed inside (see FIG. 16). The portable gaming machine 1 of the modified embodiment differs largely from the above-described portable gaming machine 1 in that storage means 3B is housed in a cartridge indicated by the one-dotted chain line in FIG. 16 and can be electrically and physically connected to or disconnected from a game control section 3C housed in the box 1K.

Disposed on a surface 1M of the box 1K are key input switches 3A (3A1 and 3A2) and first display means 6 as a flat display for displaying game information produced based on external storage medium 3B of a RON cassette, etc., (described later) by the game control section 3C in accordance with key input.

Further, also in the modified embodiment, batteries 9 are provided so as to enable the game player to play a game on the portable gaming machine in the open, etc., like the above-described portable gaming machine. The batteries 9 occupy large weight percentage as compared with the first display means 6 or the game control section 3C. In the modified embodiment, the batteries 9 occupying large weight percentage among the components of the portable gaming machine are biased to one side in the length direction, whereby the center of gravity of the portable gaming machine is biased to the one side housing the batteries 9.

The first display means 6 is disposed on the opposite side to the side in the length direction of the box 1K housing the batteries 9 and the game information is displayed in the direction in which the game player can play a game while seeing the first display means 6 with the housing side of the batteries 9 in the box 1K downward.

In addition, a string retaining part 1N is provided in a side face of the side in the length direction where the first display means 5 is disposed and an engagement part 50B of a string 50 having a loop part 50A is brought into engagement with the string retaining part 1N for fixing the string 50 and the box 1K. In the embodiment of the invention, the string 50 is put on the left of the portable gaming machine as shown in FIG. 1 and FIG. 2, but can also be put on the right thereof as indicated by the alternate long and short dash line in FIG. 13.

The string 50 is set to such a length to allow the game player to pass his or her palm through the loop part 50A of the string 50 and place his or her fingers on the operation positions of the key input switches 3A.

The box 1K has outer dimensions of 23 mm (maximum thickness), 70 mm (short side), and 112 mm (long side), and the first display means adopted as a flat display has a size of 46.5 mm×42 mm. The portable gaming machine of the embodiment is designed to be not only compact, but also lightweight to enable the game player to play a game with the portable gaming machine held by his or her hand. The term "portable gaming machine" in the specification is used to mean a gaming machine which contains a drive power supply for eliminating the need for an external power supply required for a conventional home or business use gaming machine and is designed to be lightweight and compact to enable the game player to play a game with the gaming machine supported by both hands. The term "stationary game machine" is used to mean a game machine that is not a portable game machine, such as a conventional home or arcade game machine. In other words, game machines that require an external power supply, and game machines that cannot be held in both hands, are stationary game machines.

In the embodiment, the portable gaming machine is fully worked out so that it is designed to be compact; for example, attention should be focused on the attachment part of the switch 3A2 of the key input switch 3A. As shown in FIGS. 13 and 16, the surface 1M of the box 1K where the switch 3A2 is attached shows a swelling form as compared with other portions of the surface 1M so that a stroke in the thickness direction of the box 1K can be used to switch the switch 3A. Specifically, if the game player presses the neighborhood of the outer periphery of the switch 3A2 having a circular key button form in the thickness direction thereof, the outer peripheral portion of the switch 3A2 is inclined with the switch 3A2 as the center for switching.

Alternatively, if the game player slides the switch 3A2 of a circular key button form in a plane direction, for example, left and right or back and forth, the switch 3A2 slides on a spherical slide face (not shown) and a stroke in the depth direction can be used for switching, as described above.

According to the method of sliding the switch for switching, as compared with the method of pressing the switch in the depth direction for switching, the gaming machine itself becomes compact and as the switch becomes smaller, the game player becomes easily conscious of the switching act.

The key input switches 3A1, which are both pushbuttons, are used as bullet shooting buttons in a shooting game or function as acceleration and brake operation buttons in a driving game.

The switches 3A1 and 3A2 are placed at positions such that the game player can switch the switches 3A1 and 3A2 with thumbs of both hands with the portable gaming machine supported by both hands. That is, preferably on ease of operation, the switches are placed near the move traces of thumbs when the game player moves his or her thumbs supporting the portable gaming machine by both hands so that the player can see the first display means 6.

Three long holes to allow sound from a sound reproduction unit 3C1 to easily travel to the outside are made below the pushbuttons 3A1.

A rotary knob 1P for adjusting contrast of the first display means 5 and a rotary control 1Q for adjusting the volume of sound produced from the sound reproduction unit 3C1 are disposed on a side face of the box 1K and can be operated by the game player. In the embodiment, the operation switch 3A2 is a slide switch, but any other form such as a pushbutton switch may be adopted.

Further, a pushbutton power switch (not shown) is disposed on another side face of the box 1K.

In addition, an insertion slot 1R for inserting the cartridge 3B is made in one end face of the box 1K.

Disposed in the other end face are a power connector (not shown) to receive an external power supply other than the contained batteries and an earphone connector (not shown) to allow only the player to listen to sound produced from the sound reproduction unit 3d.

The inside 1L of the box 1K houses a circuit board forming the control section 3C made up of the CPU and various electronic circuits for controlling the game program. A connector (not shown) for electric connection to the cartridge 3B at a position communicating with the insertion slot 1R is mounted on the lower face of the circuit board.

The batteries 9 are used as the drive power supply of the first display means 6, the sound reproduction unit 3d, the game control section 3C, etc. Preferably, a separate backup power supply is provided so that the temporary game result stored in the storage means 3B is not lost when the batteries are replaced, etc.

In the modified embodiment of the portable gaming machine, if an AC receptacle provided in a house exists, the portable gaming machine can be operated by receiving power through the receptacle without using the batteries 9 although not shown.

(Gaming Machine)

The gaming machine 10 roughly comprises a camera 20, second display means 16, and a printer 21 in addition to the configuration of the raising simulation gaming machine 1. The second display means 16 displays image data of a character corresponding to first raising history data transferred from the raising simulation gaming machine 1 via the transfer means 5 to the gaming machine 10 as it is, or a composite image provided by the image combining means 20A combining the image data with the image of a person having his or her photograph taken by the camera 20. The printer 21 prints the image displayed on the second display means 16 as it is or at higher resolution.

The member correspondence between the raising simulation gaming machine 1 and the gaming machine 10 is as follows: Storage means 13B corresponds to the storage means 3B; a second raising simulation game program 12 to the first raising simulation game program 2; the first raising means 3 to second raising means 13; the first storage means 4 to the second storage means 14; the first data transfer means 5 to second data transfer means 15; the first display means 6 to the second display means 16; the third storage means 7 to the fourth storage means 17; the first character determination means 8 to the second character determination means 8; and the first operation means 3A to the second operation means 3B.

Figure 3:
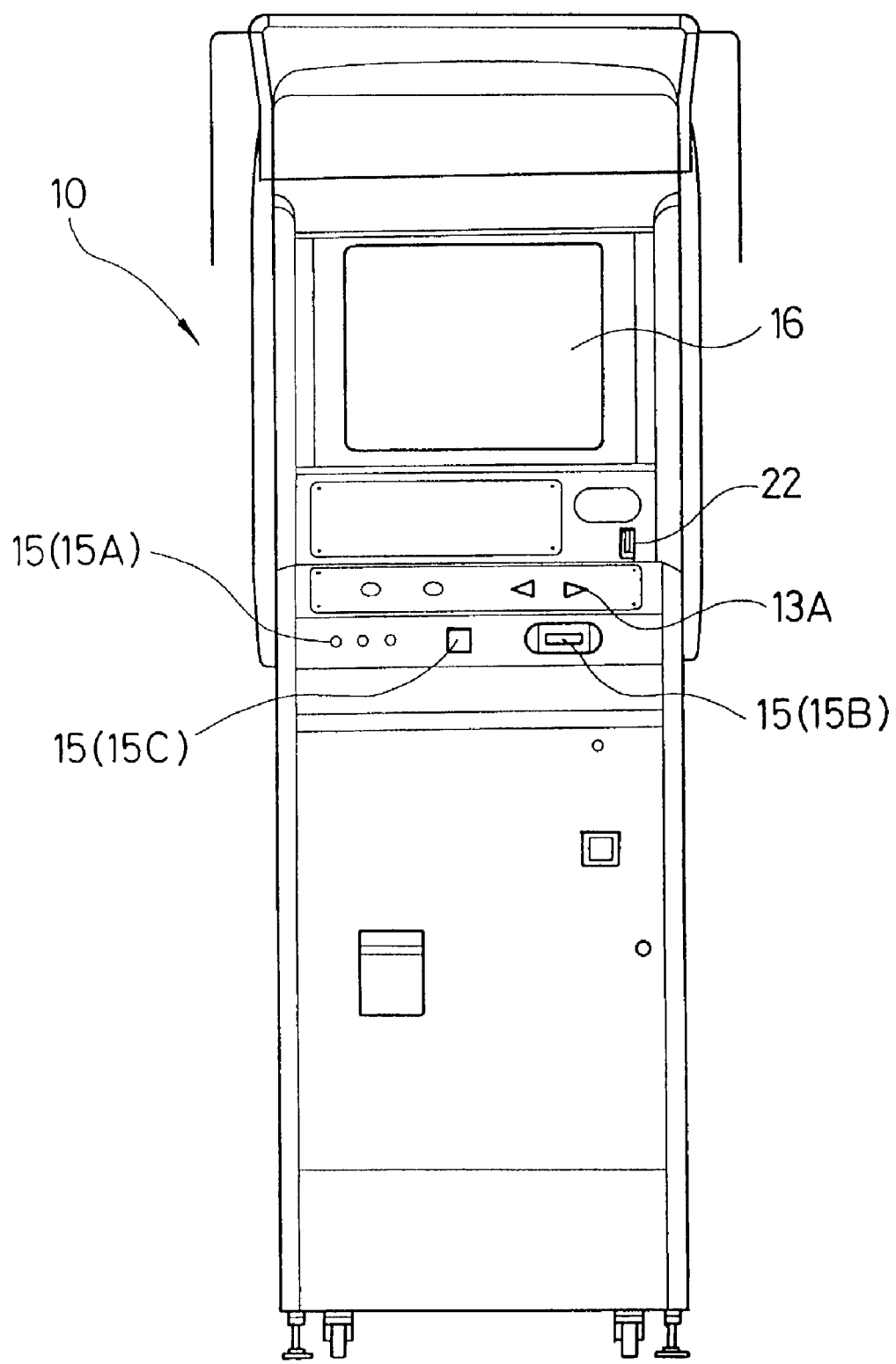
FIG. 3 is a front view of the gaming machine.

FIG. 3 is a front view to show the appearance of the gaming machine 10. FIG. 2 is a functional block diagram to show the gaming machine 10. The member correspondence between the raising simulation gaming machine 1 and the gaming machine 10 shown in FIG. 2 is as described above.

Like the raising simulation gaming machine 1, the gaming machine 10 can also raise a character by itself, in which case the members of the gaming machine 10 play the same roles as the corresponding members of the raising simulation gaming machine 1.

(Raising a Character with Raising Simulation Gaming Machines of a Portable Gaming Machine and a Gaming Machine)

Raising a character with raising simulation gaming machines of a portable gaming machine and a gaming machine will be discussed with reference to FIG. 1 to FIG. 3, FIG. 6, and FIG. 7.

The gaming machine 10 as the gaming machine discussed in the form is a business use gaming machine installed in a gaming house.

First, when a game player inputs a coin as much as a predetermined amount of money required for playing a game into a coin slot 22 shown in FIG. 3, an image as shown in FIG. 6 is displayed on the first display means 16. The game player connects the first transfer means 5 of the portable gaming machine 1 and the second transfer means 15 (15A) by a cord based on the displayed prompt. Then, when the game player selects "READ DATA" in FIG. 7 by the operation means 13A, the first raising history data stored in the first storage means 4 is transferred from the first transfer means 5 through the second transfer means 15 to the gaming machine 10. The transferred first raising history data is once stored in the second storage means 14.

The second raising means 13 starts a raising game along the second raising simulation game program 12 based on the first raising history data stored in the second storage means 14. When the game is started, the character is raised additionally in accordance with the second raising simulation game program 12 and as the game player operates the operation means 13A. The second raising history data of the additionally raised character is stored in the second storage means 14 in sequence.

The second raising history data of the additionally raised character stored in the second storage means 14 is transferred through the second transfer means 15 and the first transfer means 5 to the portable gaming machine 1. The first raising means 3 furthermore additionally raises the character along the first raising simulation game program 2 based on the transferred second raising history data.

Figure 8:
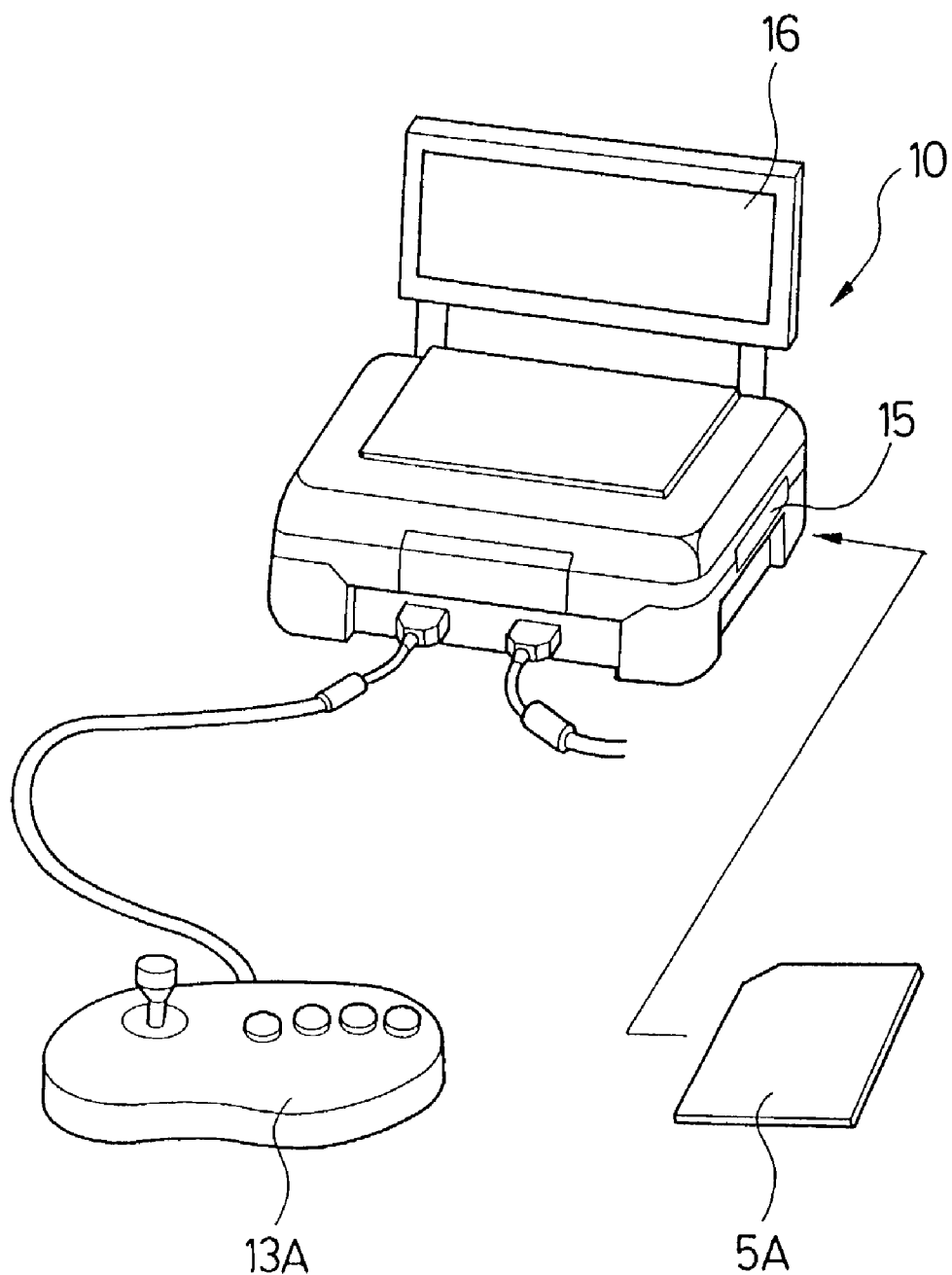
FIG. 8 is a schematic representation to show a home gaming machine requiring an external power supply incorporating the invention.

In the description of the transfer means 5 and 15, the portable gaming machine 1 and the gaming machine 10 are connected by a cable. However, alternatively, any known communication system capable of executing two-way or one-way communication can also be adopted. For example, a memory card reader 15B is provided in FIG. 3 and the first raising history data as the temporary game result is once stored on a memory card 5A from a home gaming machine requiring an external power supply as shown in FIG. 8, then the memory card 5A is read through the reader 15B as the second transfer means 15 of the business use gaming machine 10 shown in FIG. 3, whereby the first raising history data can be transferred to the gaming machine 10. An optical communication reception section 15C as shown in FIG. 3 can also be used as the second transfer means 15 for transferring the first raising history data from an optical communication reception section of the first transfer means 5 of the portable-gaming machine 1 by optical communication.

To transfer the temporary game result of the first raising history data, the second raising history data, etc., as described above without using the above-described memory card 5A or communication, the data can also be directly transferred through the internal memory of the portable gaming machine 1 as described above. Specifically, physical connection is made possible between the second transfer means 15 of the business use gaming machine 10 shown in FIG. 3 and the home gaming machine shown in FIG. 8 and the first transfer means 5 of the portable gaming machine 1, then the portable gaming machine 1 is connected to the home gaming machine 10 at one time for transferring the temporary game result data therebetween and is connected to the business use gaming machine 10 at one time for transferring the temporary game result data therebetween. In this case, the portable gaming machine 1 plays a similar role to that of the memory card 5A.

(Preparation of Composite Image of Raised Character and Game Player)

As described above, the gaming machine 10 can prepare a virtual raised character image by the second character determination means 18 from image data in the fourth storage means 17 based on the second raising history data in the second storage means 14 (the character state not additionally raised by the second operation means 3A, etc., namely, the first raising history data may be stored as the second raising history data) and combine the prepared image data with image data of the game player having his or her photograph taken by the camera 20 by the image combining means 20A. The camera 20 and the image combining means 20A are not indispensable members to use the gaming machine simply as a character raising game.

However, the camera 20 and the image combining means 20A enable the composite image (photograph) of the raised character and the game player to be displayed on the second display means 16, and the character raised in the virtual world and the game player in the real world can be brought into contact with each other on the first display means.

The image data of the character prepared according to the second raising history data stored in the fourth storage means 17 is finely classified or delicately represented as compared with the image data in the third storage means 7 prepared according to the second raising history data, whereby the image can be displayed more clearly and can be changed when the raising state a little changes as compared with the image displayed on the second display means 6. In the third storage means 7 and the fourth storage means 17, different images (one is a monochrome image and the other is a full color image having a large data amount) are generated based on the same raising history data, whereby the more real image of the character raised in the virtual world is~ displayed on the second display means 16 of the gaming machine 10.

(Printing of Character Image)

The printer 21 is connected to the image combining means 20A of the gaming machine 10. The printer 21, which is also optional, is connected to the image combining means 20A, whereby the image displayed on the first display means 16 can be printed; for example, ceremonies responsive to the age of the character, such as a graduation ceremony and a wedding, and a growth process can be left in the image form.

If the composite image provided by the image combining means 20A combining the image data with the image of the game player having his or her photograph taken by the camera 20 is printed on the printer 21, the character raised in the virtual world and the game player can be brought into contact with each other so that the game player feels a stronger attachment to his or her raised character and can obtain pleasure like raising of a real pet.

The gaming machine is configured as a simple print gaming machine having no raising simulation game program and the raising history data of the character raised with the portable gaming machine is transferred to the print gaming machine, whereby the raised virtual character can be printed. In this case, the character is not additionally raised on the gaming machine.

In such a configuration wherein the character is not additionally raised on the gaming machine, the transfer means 15 may have a function as data reception means simply for receiving the raising history data from the portable gaming machine.

(Transfer of Temporary Game Result Between Portable Gaming Machines)

Figure 9:
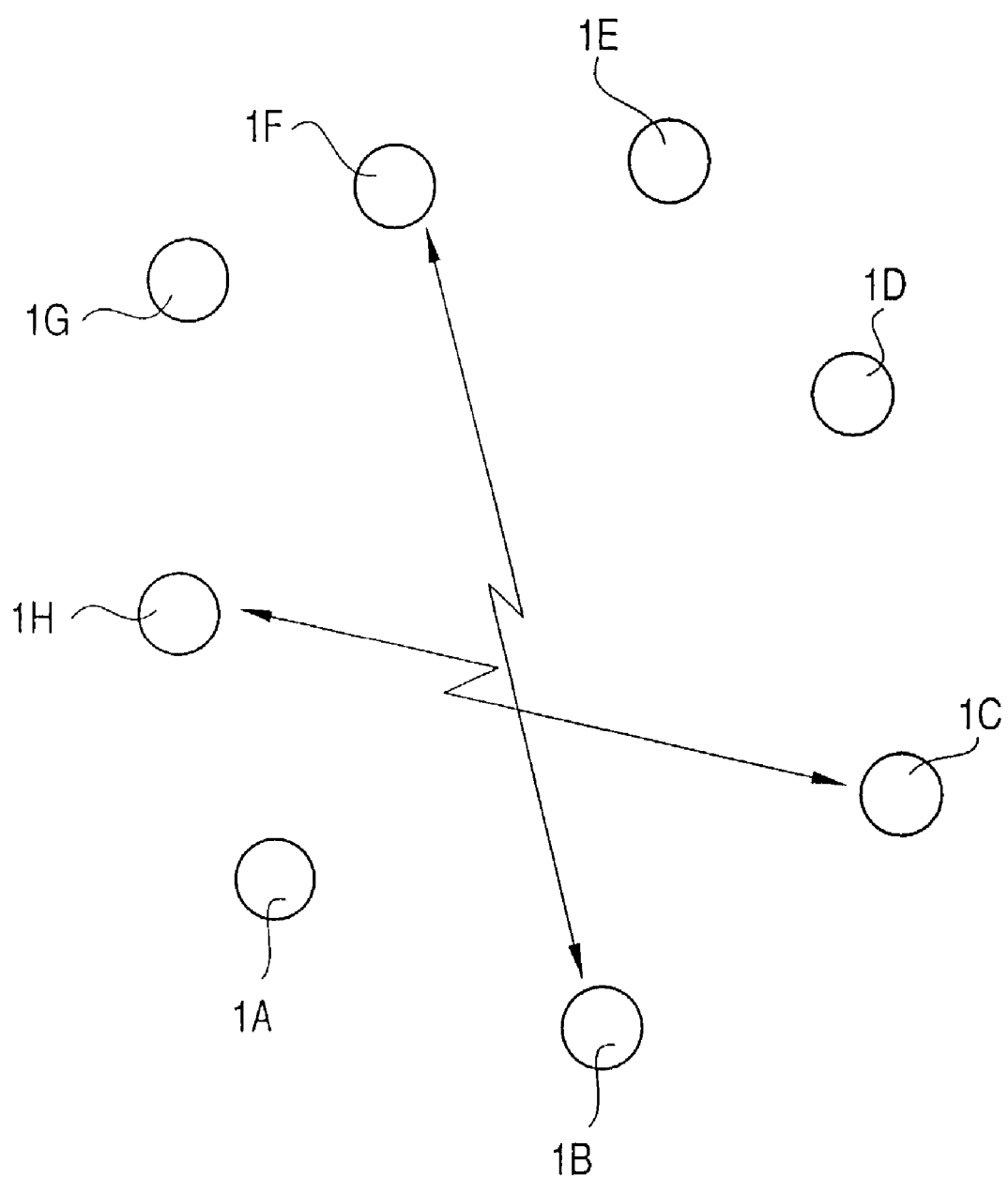
FIG. 9 is a schematic representation to show transfer of raising history data between portable gaming machines.

FIG. 9 is a schematic drawing to show how the temporary game result in one portable gaming machine is transferred to another portable gaming machine for exchanging the raised characters with each other or porting the raised character from one portable gaming machine to another. In this case, the same game program is stored in the portable gaming machines.

The game ability can be widened like a surrogate mother, a marriage, a marriage meeting, etc., by making it machine to another.

(Composition of Virtual World Made up of Portable Gaming Machines and Gaming Machines)

Virtual World 1

Figure 10:
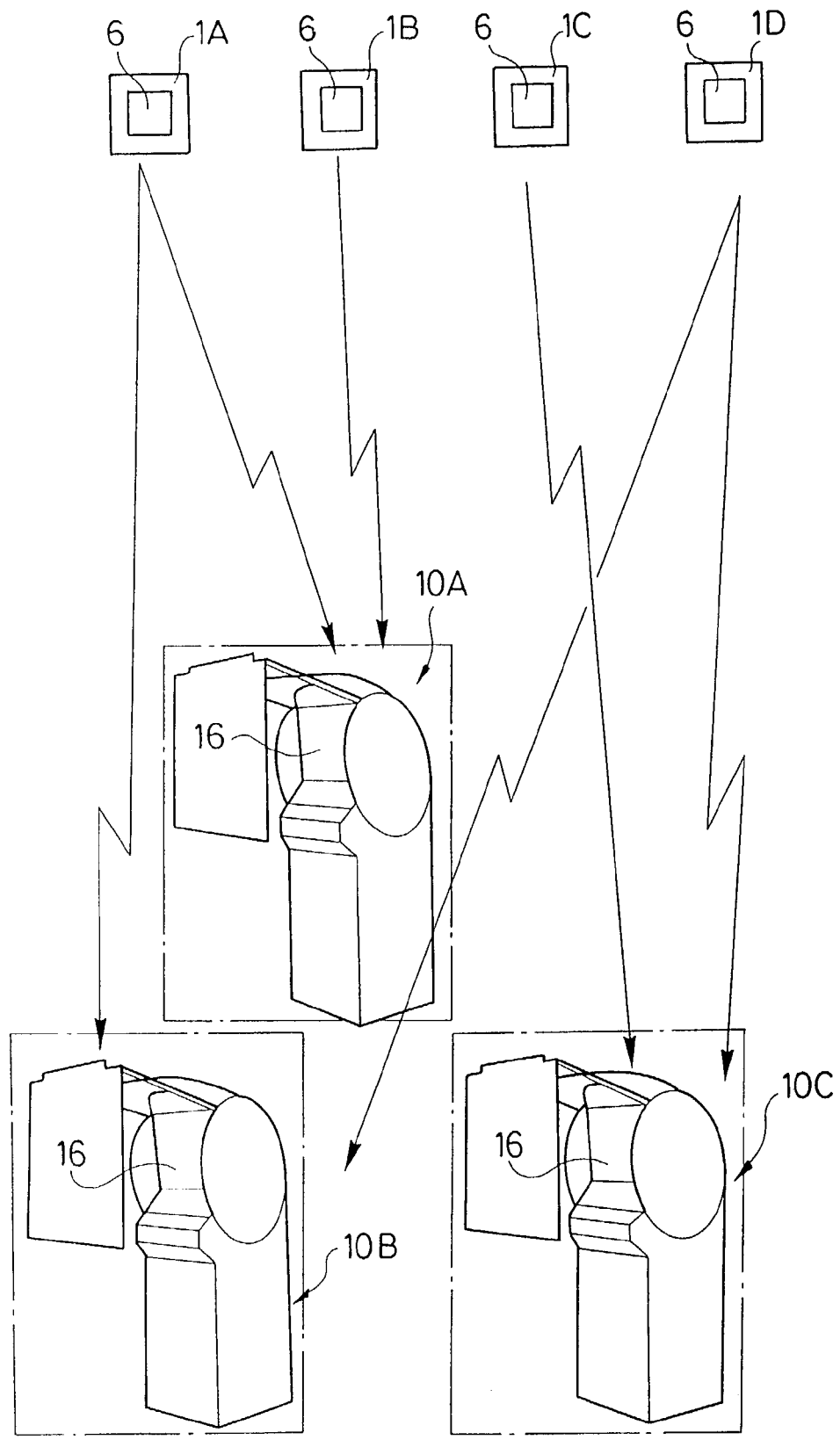
FIG. 10 is a schematic representation to show virtual world 1.

FIG. 10 is a diagram to show the composition of a virtual world consisting of portable gaming machines 1 and business use gaming machines 10 placed in stores, etc.

Numerals 1A to 1D are portable gaming machines 1 owned by game players. Numerals 10A to 10C are gaming machines 10 each comprising the camera 20 and the image combining means 20A. Moreover, they have different second raising simulation game programs 12. The second raising simulation game program 12 of the gaming machine 10A is a program concerning "hospital" for enabling the game players to play a game of curing a serious disease occurring when raising characters in their gaming machines 1A to 1D (homes in the real world). Various types of game play are possible; for example, the game player selects a good one from among hospitals and selects a doctor who seems capable in the hospital for performing an operation on the raised character, etc. Of course, first and second game programs differ and are advanced, whereby different games can be executed.

The composite image of the raised character and the game player having his or her photograph taken by the camera 20 can also be printed on the printer 21 to commemorate leaving the hospital. The gaming machine 10B is a "school," for example. The temporary game result as first raising history data is transferred to the gaming machine 10B as a school and intelligence, etc., of the additionally raised character is improved by a second game program different from a first game program, then the temporary game result as second raising history data is returned to the raising simulation gaming machine 1A to 1D.

Such transfer is executed by the transfer means (5, 15). The transfer system may be a wire or radio system. Although any system of light, sound, or a radio wave may be adopted as the radio system, the portable gaming machine 1 needs to be provided with an internal power supply 9 as a radio power supply.

The portable gaming machine is thus provided with the internal power supply 9, whereby to change the image of the raised character a little (to the next growth stage) on the gaming machine 10, the character can be additionally raised on the spot for obtaining a favorite image. If the portable gaming machine does not have the internal power supply 9, the game player needs to once go home for additionally raising the character; since the portable gaming machine has the internal power supply 9, the game player can additionally raise the character on the spot without such trouble.

If the game program of the gaming machine 10B to which the temporary game result -is transferred is a school as described above, when the game player plays a game on the gaming machine 10B, the character becomes clever. When the character becomes clever, the effect of changing the expression of the character or making the character more reasonable is produced as the character becomes clever. The gaming machine 10C is a "karate hall," for example. As the raised character goes to karate hall, the character may be able to be well built, improve in power level as a combative athlete, or acquire techniques. The level as a combative athlete, etc., is stored as the temporary game result as the second raising history data.

Virtual World 2

Figure 11:
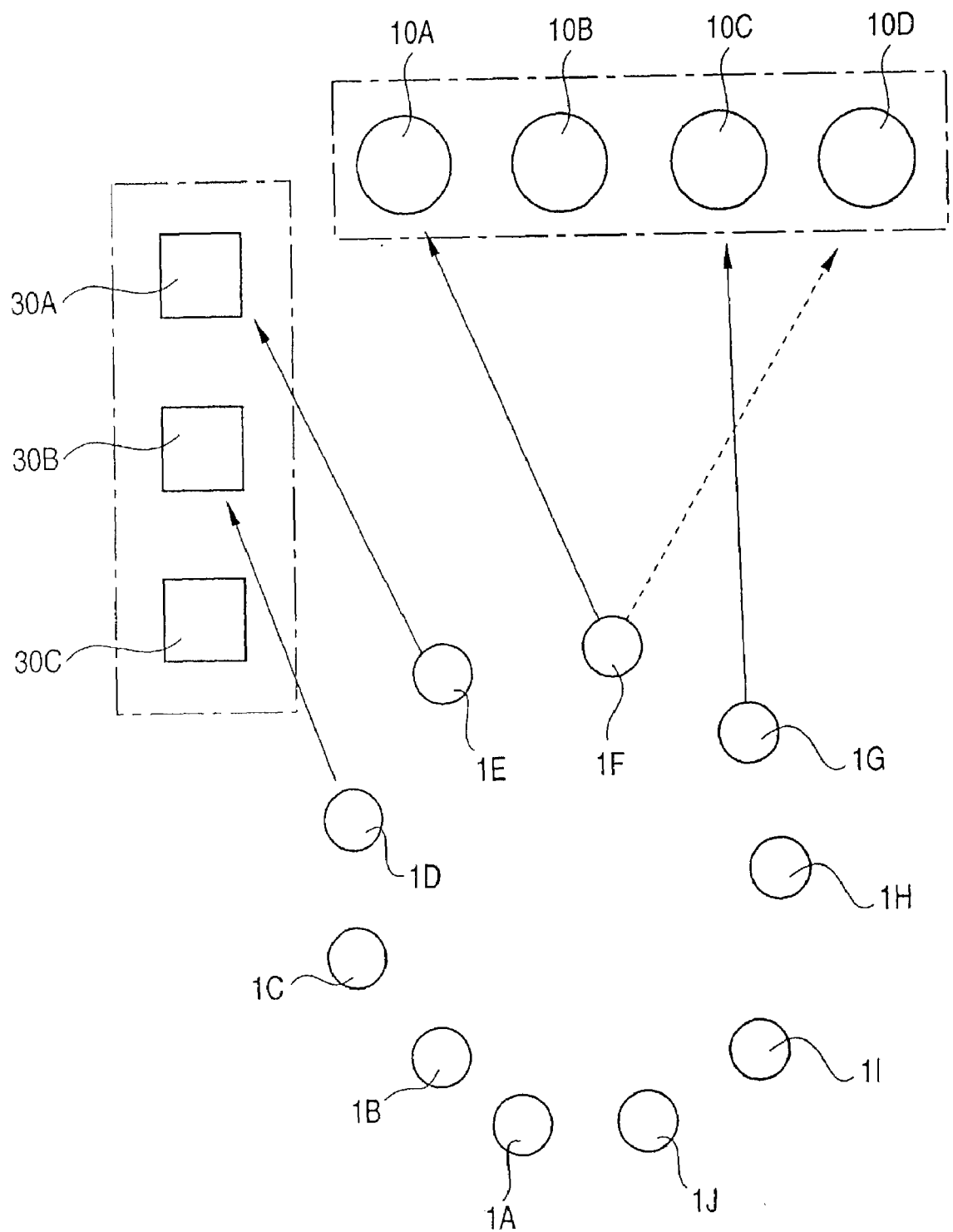
FIG. 11 is a schematic representation to show—virtual world 2.

FIG. 11 assumes another virtual world. The gaming machines 10A to 10C in the virtual world 1 can display the composite image of the raised character and the person having his or her photograph taken on the second display means 16 and print the image. The invention is not limited to gaming machines each comprising a camera and an image reproduction unit. That is, a gaming machine not comprising a camera or an image reproduction unit, such as a product named MVS sold by the applicant is used as the above-described "hospital" or "school" as social facilities and a virtual raised character can be made to artificially experience communication with the outside in the real world on the gaming machine.

Gaming machines 10A to 10D comprise different second raising simulation game programs 12, which correspond to different social facilities like the portable gaming machines 10A to 10C in the virtual world described above. However, the gaming machines 10A to 10D in FIG. 11 do not contain the camera 20 or the image combining means 20A in FIG. 2.

Figure 12:
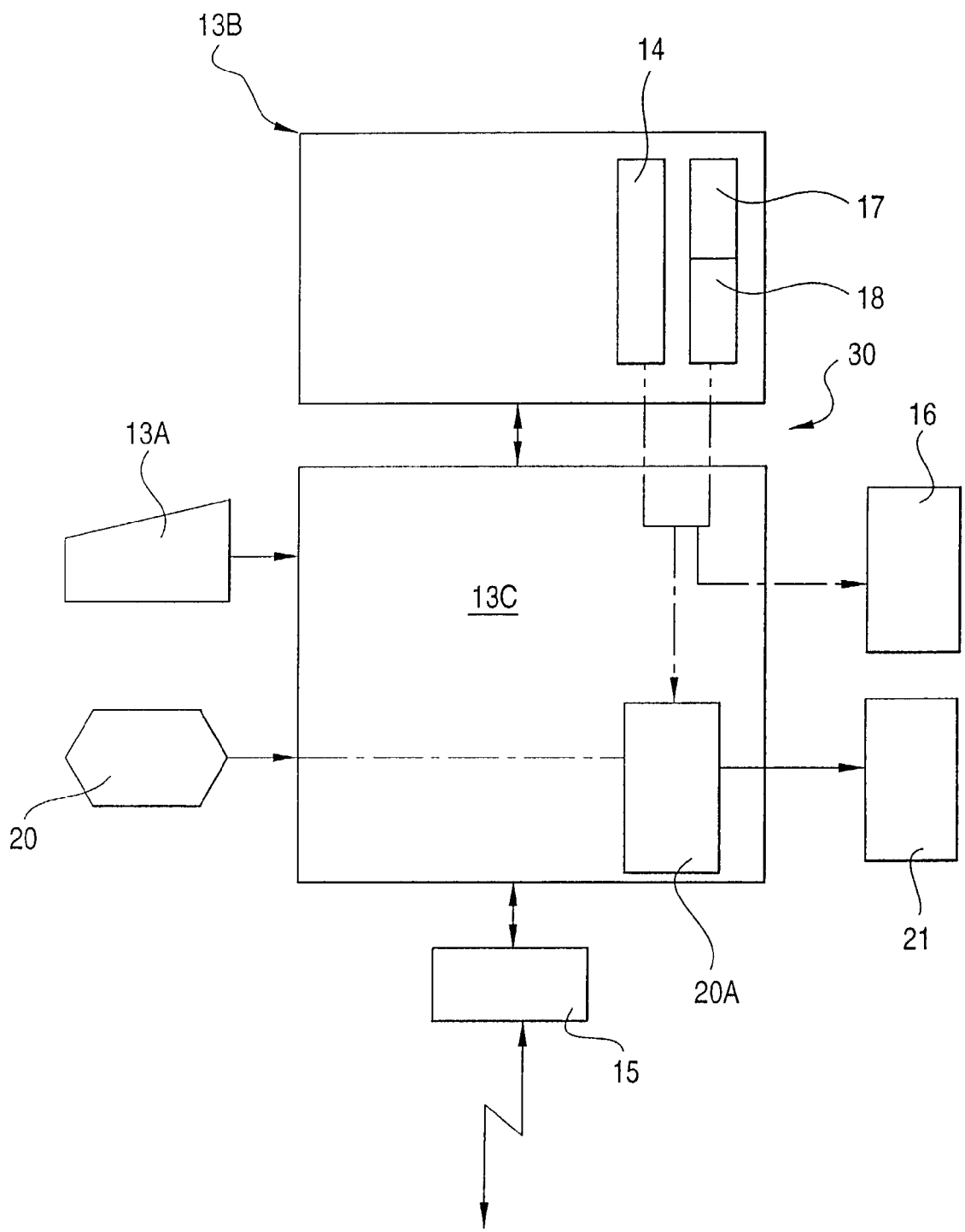
FIG. 12 is a functional block diagram of another gaming machine.

Each of gaming machines 30A to 30C in FIG. 11 is provided by excluding the second raising means 13 and the second raising simulation program 12 from the gaming machine 10. That is, the gaming machines 30A to 30C correspond to "photo studios" in the social facilities. FIG. 12 shows the gaming machine 30. Parts similar to those previously described with reference to FIG. 2 are denoted by the same reference numerals in FIG. 12. The gaming machine as a "photo studio" contains a game program for combining a raised character with previously stored background and foreground and allowing the game player to enter desired letters in a predetermined sequence rather than the virtual character raising game program in "school," etc., described above.

The "photo studios" for printing the composite image of the game player and the raised character or the image of the character by itself and various raising social facilities for raising the character are placed in a store such as a gaming house of amusement facilities as dedicated machines, whereby the above-described various gaming machines are specialized and when queuing for playing a game, the game player can easily estimate the wait time because the same type of game is played on the raising simulation gaming machines and the game play time does not extremely differ. Personnel in the store can predict what virtual social facilities, namely, raising simulation gaming machines will become insufficient for players to play games and can easily recognize the virtual social facilities to be added.

Further, the second raising simulation game programs contained in the gaming machines 10A to 10D as the virtual social facilities can also be installed in one gaming machine in a multi-cassette system so that the gaming machine is changed from "karate hall" to "stadium" by replacing cassettes. To adopt such a multi-cassette system, a known system as described in the Unexamined Japanese Utility Model Application Publication No. Sho 60-135764 or 63-3886 may be used.

Using the memory card reader 15B, image data of game player looks, etc., can be read from a digital still-video camera and be combined with the image data of the raised character by the image combining means 20A for displaying the composite image on the second display means 16 or printing the image on the printer 21.

The character image or the composite image of the character and a person (game player) having his or her photograph taken, displayed on the second display means 16 of the gaming machine 10 can be once stored on a memory card provided by the game player through the memory card reader 15B so that the game player can reproduce the stored data on the memory card with his or her digital camera or display on a home television.

According to the above-described inventions, there are respective advantages as below.

According to the invention as claimed in claim 1, the temporary result of a game played on two or more different portable gaming machines is transferred by the data transfer means to a gaming machine requiring an external power supply, such as a coin-operable business use gaming machine installed in a store, etc., or a home gaming machine. For example, the capability of the character prepared based on the temporary game result transferred is set and the player can play a game in response to the game program of the gaming machine based on the setup character capability.

For example, when the game program of the gaming machine provides a combative sport game, if the character raised by the player on his or her portable gaming machine has a lower capability than the competitor and has no chance of winning, the player can additionally raise the character on the spot. The additional raising also contains, for example, the act of changing the weapon used by the character, changing the character from a magician to a martial art athlete, etc.

Preferably, the radio system as claimed in claim 3 is adopted as a method of transferring the game data as the temporary game result on the portable gaming machine by the data transfer means. Since the portable gaming machine of the invention comprises an internal power supply, the data can be transferred to the radio system as well as the conventional transfer method via a recording medium such as floppy disk. The radio system eliminates the need for a floppy drive mechanism unit, decreases the number of parts, and if data is transferred from a plurality of portable gaming machines, eliminates the need for providing a plurality of slots connecting the portable gaming machines and gaming machines of business use gaming machines, etc. For example, if a memory card is connected to the data transfer means as a storage medium for transferring data, two memory card insertion slots become necessary in the gaming machine to which the data is transferred.

According to the invention as claimed in claim 4, the first or second raising history data of the raised character can be transferred between the first and second raising simulation gaming machines or from one raising simulation gaming machine to another and the character can be additionally raised by the second raising simulation game program in the second raising simulation gaming machine based on the first raising history data prepared in the first raising simulation gaming machine, thus the character can be raised while communicating with a different world or society.

Further, a character image is prepared based on the image data previously stored in the image data storage means (fourth storage means) based on the first or second raising history data and the prepared image data can be displayed on the second display means, so that the raising result can be displayed on the second display means of the second raising simulation gaming machine.

In the invention as claimed in claim 5, the image displayed on the second display means can be reproduced on the image reproduction unit and the image of the raised character can be held as a photo. Such an act plays a role as a commemorative photo of the raised pet.

In the invention as claimed in claim 6, the first raising history data is passed on the second raising simulation gaming machine and the character can be displayed based on the image data storage means (fourth storage means) contained in the second raising simulation gaming machine different from the first raising simulation gaming machine based on the first raising history data, whereby, for example, a larger amount of image data than that in the image data storage means (third storage means) in the first raising simulation gaming machine is provided in the image data storage means (fourth storage means) and a display unit of high resolution that can reproduce the image data stored in the image data storage means (fourth storage means) can also be used as the second display means to display the raised virtual character; a more rich and real image represented more accurately can be provided.

That is, the amount of data stored in the image data storage means (fourth storage means) in the second raising simulation gaming machine as the data amount required for character image preparation from one raising history data piece is set larger than the data amount in the image data storage means (third storage means) in the first raising simulation gaming machine or the second display means uses a display unit of higher resolution than the first display means, so that the image displayed on the second display means can be made sharper, clearer, and finer than the image displayed on the first display means in the first-raising simulation gaming machine. For example, the-first raising simulation gaming machine is made portable, handy, and compact at low cost and the second raising simulation gaming machine is provided with the capabilities of displaying and printing a sharper, clearer, and finer image. The raising state is finely classified and although the character raising state changes a little, the raising state difference cannot be recognized on the first display screen, but can be recognized on the second display screen, whereby the character display image can be varied between the first and second display means.

In the invention as claimed in claim 7, the image of a person having his or her photograph taken by the camera is combined with the image of the raised character and the composite image is printed, whereby a commemorative photo of a raised child and a dog, a cat, etc., can be taken as in the real world. That is, the contact between the virtual character raised in the virtual world and the game player of a foster parent in the real world appears in the composite picture, thus the player can feel a realer attachment to the virtual character. This means that the virtual and real worlds can be represented in a piece in the printed commemorative photo. Preferably, the printing unit is a video printer or any other color printer, but may be a monochrome printer, etc. Various printers such as ink jet and thermal transfer printers are available. A composite photo of -the game player and the character raised on the raising simulation gaming machine or a loved character is taken, whereby the contact between the real and virtual worlds is created and the game ability richer in reality can be widened.

According to the invention as claimed in claim 8, the image of the virtual character raised on the portable gaming machine can be printed on a dedicated print gaming machine. That is, since the portable gaming machine needs to be formed small so that the player can carry it, a print function cannot be installed in the portable gaming machine, but such a problem can be solved by enabling data to be transferred between the portable gaming machine and the dedicated print gaming machine.

According to the invention as claimed in claim 9, in addition to the advantage in claim 8, a print on which the virtual character raised and the player raising the character are taken can be provided. The print becomes the contact between the real world and the virtual world raising the character and the game player can feel an increased attachment to the character raised on the portable gaming machine.

According to the invention as claimed in claim 9, the portable gaming machine can play a role as a so-called health exercise machine. For example, if the person carrying the portable gaming machine do not much walk, the fact that the virtual character becomes short of exercise can also be represented by voice or an image for prompting the person carrying the portable gaming machine to exercise. Of course, the game player can also vibrate the portable gaming machine supported by his or her hand for making the character exercise.

We claim:

1. A game machine system comprising:
    a stationary game machine having an external power supply;
    a portable game machine having an internal power supply; and
    a connector configured for transferring data between the stationary and portable game machines;
    wherein said stationary game machine is configured for playing games from a first set of one or more game programs, the first set of game programs contains data for displaying on the stationary game machine a game result from the portable game machine;
    wherein said portable game machine is configured for playing games from a second set of one or more game programs, the second set of game programs contains a character raising simulation game program, and differs from the first set of game programs;
    wherein said stationary game machine is configured to receive game result data from said portable game machine via the connector, the game result data representing the results of one or more games from the second set of game programs that were played on said portable game machine; and wherein said stationary game machine is configured to play a game, from the first set of game programs, that is based on the received game result data.

2. The game machine system as claimed in claim 1, wherein said connector connects between said stationary game machine and said portable game machine via electromagnetic waves.

3. The game machine system as claimed in claim 2, wherein said connector is configured as a system selected from the group of a spurious spread system, a time division system, a frequency shift key system, an infrared communication system, a pulse communication system, an AM communication system, and an FM communication system.

4. The game machine system according to claim 1, wherein:
the stationary game machine and the first set of one or more game programs are configured to display three-dimensional images on a first display, the three-dimensional images being associated with the play of the stationary game machine's games; and
the portable game machine and the second set of one or more game programs are configured to display two-dimensional images on a second display, the two-dimensional images being associated with the play of the portable game machine's games.

5. A game machine system comprising:
a first, portable game machine having an internal power supply, and including
a first game program configured to simulate raising a character through a first state change from a first initial state to a first raised state, and
a state memory configured to store data received from the first game program representing a first raised state of a character that was raised via the first game program;
a second, stationary game machine having an external power supply, and including
a second game program configured to simulate raising a character through a second state change from a second initial state to a second raised state,
a state memory configured to store data received from the second game program representing a second raised state of a character, and
an image memory for storing image data based on at least one of a character's first or second raised states, and
a display configured to display an image based on image data stored in said second game machine's image memory; and
a connector configured to transfer data between said first game machine and said second game machine,
wherein said first and second game machines are configured such that data representing the first raised state of a character can be transferred from said first game machine to said second game machine through said connector;
wherein said second game machine can use the first raised state of a character transferred from the first game machine as the initial state for the second state change; and
wherein said second game machine contains data for displaying on the second game machine a game result from the first name machine.

6. The game machine system as claimed in claim 5, wherein said second game machine further comprises an image printer configured to print character images based on image data in said second game machine's image memory.

7. The game machine system as claimed in claim 5, wherein said first game machine further includes
an image memory configured to store image data based on the first raised state of a character; and
a first display configured to display an image based on image data stored in said first game machine's image memory;
wherein the image data stored in said second game machine's image memory is of higher image quality than the image data stored in said first game machine's image memory; and
wherein images displayed on said second game machine's display are of higher quality than like images displayed on said first game machine's display.

8. The game machine system according to claim 5, wherein:
the first game machine and the first game program are configured to display two-dimensional images on a display associated with the first game machine, the two-dimensional images being associated with playing the first game program; and
the second game machine and the second game program are configured to display three-dimensional images on the second game machine's display, the three-dimensional images being associated with playing the second game program.

9. A game machine system comprising:
a first, portable game machine having an internal power supply, including
a game program configured to simulate raising a character through a state change from an initial state to a raised state, and
a state memory configured to store state data received from the first game program representing the raised state of a character that was raised via the game program;
a second, stationary game machine having an external power supply including
a game program containing data for displaying on the stationary game machine a game result from the portable game machine,
an image production unit, and
an image memory configured to store image data for an image; and
a data connector configured to transfer state data from said first game machine to said second game machine;
wherein the second game machine is configured to produce image data in the image memory, the image data representing an image of a character in a raised state based on state data transferred to the second game machine via the data connector; and
wherein the second game machine is configured to produce an image on its image production unit from the image data in the image memory.

10. The game machine system as claimed in claim 9, wherein the image production unit is a printer.

11. The game machine system as claimed in claim 9, wherein said second game machine further includes:
a camera configured to generate image data representing a person's image; and
a circuit configured to combine the image data representing a person's image with the image data representing an image of a character in a raised state to form combined image data;

wherein the second game machine is configured to produce a combined image on its image production unit from the combined image data.

12. The game machine system as claimed in claim 11, wherein said image production unit is selected from the group of a display, a printer, or a laser beam machining unit.

13. The game machine system as claimed in claim 9, wherein said first game machine further includes a vibration sensor; and wherein the first game program raises the character based vibration sensed by said vibration sensor.

14. The game machine system as claimed in claim 13, wherein said first game machine further includes a hook.

15. The game machine system as claimed in claim 9, wherein the game program is configured to produce data representing the raised state of a character based on player participation.

16. A method of raising a virtual character through a state change from a first raised state to a second raised state, wherein the virtual character was raised to the first raised state via a first game program in a portable game machine having an internal power supply, through a state change from a first initial state, and wherein the portable game machine has a state memory, comprising:
   storing data in the portable game machine's state memory, the stored data representing the first raised state of the character;
   transferring the data representing the first raised state of the character from the portable game machine's state memory to a state memory in a stationary game machine having an external power supply, wherein the data is transferred via a connector configured to transfer data between the portable game machine and the stationary game machine, wherein the stationary game machine includes a game program configured to simulate raising a character through a state change from a second initial state to a raised state, and wherein the stationary game machine's game program is configured to determine the second initial state of the character from the data stored in the stationary game machine's state memory;
   displaying on the stationary game machine a name result from the portable game machine; and
   raising the state of the character through a state change from the first raised state to a second raised state using the second game program.

17. The method as claimed in claim 16, and further comprising:
   transferring data representing the second raised state of the character from the stationary game machine to the state memory in the portable game machine, wherein the data is transferred via the connector; and
   again raising the state of the character, from the second raised state to a third raised state, using a game program on the portable game machine.

18. The method as claimed in claim 16, and further comprising:
   transferring image data representing the second raised state of the character to a image memory; and
   displaying an image based on the image data stored in the image memory.

19. The method as claimed in claim 16, the first game program being configured to display a two-dimensional image on a first display, and the two-dimensional image being associated with the play of the first game, wherein:
   in the step of raising the state of the character, the second game program is configured to display a three-dimensional image on a second display, the three-dimensional image being associated with the play of the second game.

20. A game machine system comprising:
   a stationary game machine having an external power supply, including a game program configured to play a game leading from a stationary-game-machine initial state to a stationary-game-machine game result state, the game program contains data for displaying on the stationary game machine a game result from a portable game machine; and
   at least one portable game machine having an internal power supply, including a game program configured to play a character raising simulation game leading from a portable-game-machine initial state to a portable-game-machine game result state;
   wherein the stationary game machine and the at least one portable game machines are each configured to transmit a game result state to one another;
   wherein the stationary game machine and the at least one portable game machines are each configured to receive a game result state transmitted from one another;
   wherein the stationary game machine is configured to use a received game result state as a basis for creating the stationary-game-machine initial state for playing its game so as to provide a relationship between a received game result state and the game result state of a subsequently played game on the stationary game machine; and
   wherein the at least one portable game machines are each configured to use a received game result state as a basis for creating the portable-game-machine initial state for playing its game so as to provide a relationship between a received game result state and the game result state of a subsequently played game on the portable game machine.

21. The game machine system according to claim 20, wherein the game played by the game program on the at least one portable game machine is different from the game played by the game program on the stationary game machine, and wherein the game programs are configured to allow sequential transferred game result states, each sequential transferred game result state having a relationship to the prior sequential transferred game result state.

22. The game machine system according to claim 20, wherein:
   the portable game machine and its game program are configured to display a two-dimensional image on a first display, the two-dimensional image being associated with the play of the portable game machine's game; and
   the stationary game machine and its game program are configured to display a three-dimensional image on a second display, the three-dimensional image being associated with the play of the stationary game machine's game.

23. A method for playing a game, comprising:
   raising a virtual game character from an initial state to a raised state according to a game player's input to a first game program in a portable game machine having an internal power supply, the first game program being configured to play a first game;
   storing the raised state of the first game program's virtual game character in a memory device; and
   playing a second game with a virtual game character that starts from an initial state, the second game being played according to a game player's input to a second game program in a second, stationary game machine having an external power supply, wherein the second game contains data for displaying on the stationary game machine a game result from the portable game machine, and wherein the second game is different from the first game;

wherein the initial state of the second game program's virtual game character is based on the raised state of the first game program's virtual game character that is stored in the memory device.

24. The method of claim 23, wherein in the step of playing a first game, the memory device is a removable memory card.

25. The method of claim 23, wherein:

in the step of raising, the first game program is configured to display a two-dimensional image on a first display, the two-dimensional image being associated with the play of the first game; and in the step of playing a second game, the second game program is configured to display a three-dimensional image on a second display, the three-dimensional image being associated with the play of the second game.

26. A method for playing interactively, comprising:

playing a first game that is on a first, portable game machine having an internal power supply, that includes a first game program and a state memory, wherein playing the first game program raises a first virtual character through a state change from an initial state to a raised state, and stores data representing the raised state of the first virtual character in the state memory;

transferring data representing the raised state of the first virtual character from the state memory to a second, stationary game machine having an external power supply, that includes a second game program; and interactively playing a second game with one or more other players using the second game program, wherein the second game program contains data for displaying on the stationary game machine a game result from the portable game machine, and wherein the second game is played with a virtual character based on the data transferred to the second game machine from the state memory, and wherein the one or more other players play with virtual characters based on other data transferred to the second game machine, the other data representing the raised states of other virtual characters that were raised through state changes from initial states to raised states.

27. The method of claim 26, wherein in the step of playing a first game, the state memory is contained in a removable memory card.

28. The method of claim 26, wherein, in the step of playing a first game, the first game is a combat game.

29. The method of claim 26, wherein:

in the step of playing a first game, the first game program is configured to display a two-dimensional image on a first display, the two-dimensional image being associated with the play of the first game; and in the step of interactively playing a second game, the second game program is configured to display a three-dimensional image on a second display, the three-dimensional image being associated with the play of the second game.

* * * * *